(12) United States Patent
Di Tata

(10) Patent No.: US 12,397,969 B2
(45) Date of Patent: Aug. 26, 2025

(54) HOLDER WITH STRAP

(71) Applicant: Daddy Loves!, LLC, Los Angeles, CA (US)

(72) Inventor: Daniel Martin Di Tata, Los Angeles, CA (US)

(73) Assignee: Daddy Loves!, LLC, Los Angeles, CA (US)

( * ) Notice: Subject to any disclaimer, the term of this patent is extended or adjusted under 35 U.S.C. 154(b) by 0 days.

(21) Appl. No.: 17/213,644

(22) Filed: Mar. 26, 2021

(65) Prior Publication Data

US 2021/0284390 A1      Sep. 16, 2021

Related U.S. Application Data

(63) Continuation of application No. 15/925,641, filed on Mar. 19, 2018, now Pat. No. 10,961,019, which is a continuation of application No. 13/836,518, filed on Mar. 15, 2013, now Pat. No. 9,919,842.

(51) Int. Cl.
| | |
|---|---|
| *A47G 19/08* | (2006.01) |
| *A47G 19/10* | (2006.01) |
| *A47G 23/06* | (2006.01) |
| *B65D 25/20* | (2006.01) |
| *A47G 19/02* | (2006.01) |

(52) U.S. Cl.
CPC ............. *B65D 25/20* (2013.01); *A47G 19/08* (2013.01); *A47G 19/10* (2013.01); *A47G 23/0608* (2013.01); *A47G 19/02* (2013.01); *B65D 2313/02* (2013.01); *Y02W 30/80* (2015.05)

(58) Field of Classification Search
CPC ......... A45F 2005/006; A45F 2005/008; B65D 81/18; A47G 19/08
See application file for complete search history.

(56) References Cited

U.S. PATENT DOCUMENTS

| | | | |
|---|---|---|---|
| 1,352,863 A | * | 9/1920 | Zeitler .................. A44C 5/003 |
| | | | 206/811 |
| 1,573,239 A | | 2/1926 | Gilliland |
| 1,738,557 A | | 12/1929 | Beiling |
| 2,338,816 A | | 1/1944 | Lockhart |
| 2,420,673 A | | 5/1947 | Monrad |
| 2,631,722 A | | 3/1953 | Klippert |
| 3,117,759 A | | 1/1964 | Herer |
| 3,407,757 A | | 10/1968 | Warner |

(Continued)

*Primary Examiner* — Andrew T Kirsch
(74) *Attorney, Agent, or Firm* — Sheppard Mullin Richter & Hampton LLP

(57) ABSTRACT

A food holding device includes a receptacle member having a body and a surrounding wall for containing food. A flexible strap is attached to the receptacle member. One end of the strap is connectible to secure the receptacle around an object (e.g., a thigh of a child). The flexible strap has ends that are configured for releasable connection (e.g., using hook and loop material). The ends can overlappingly connect to secure the receptacle to the child. The strap can be attached to the receptacle member in a number of ways, and may be removable. A liner and/or a closure device (e.g., lid or drawstring) may be used with the device. The receptacle member can receive and hold a container or a pre-packaged item. The receptacle member can be a pre-packaged item itself with an attached or attachable strap. One or more parts of the device can be disposable and/or reusable.

26 Claims, 23 Drawing Sheets

(56) References Cited

U.S. PATENT DOCUMENTS

| | | | |
|---|---|---|---|
| 4,096,977 | A | 6/1978 | Barville |
| 4,220,302 | A | 9/1980 | Hampton |
| 4,243,249 | A | 1/1981 | Goss |
| 4,401,245 | A | 8/1983 | Zills |
| 4,406,207 | A | 9/1983 | Criscione |
| 4,441,490 | A | 4/1984 | Nirschl |
| 4,498,613 | A | 2/1985 | Donahue |
| 4,718,623 | A | 1/1988 | McClure |
| 4,728,147 | A | 3/1988 | Dutton |
| 4,802,602 | A | 2/1989 | Evans |
| 4,988,097 | A | 1/1991 | Smith |
| 4,989,811 | A | 2/1991 | Millis |
| 4,993,611 | A | 2/1991 | Longo |
| 5,176,274 | A | 1/1993 | Jenkins |
| 5,222,643 | A | 6/1993 | Platt |
| 5,313,807 | A | 5/1994 | Owen |
| 5,465,888 | A | 11/1995 | Owens |
| 5,558,440 | A | 9/1996 | Miller |
| 5,607,091 | A | 3/1997 | Musacchia |
| 5,613,657 | A | 3/1997 | Olaiz |
| 5,624,090 | A | 4/1997 | Gammelgaard |
| 5,779,211 | A | 7/1998 | Bird |
| 5,855,307 | A | 1/1999 | Biddick |
| 5,862,927 | A | 1/1999 | Tebeau |
| 5,862,933 | A | 1/1999 | Neville |
| 5,873,551 | A | 2/1999 | Jones |
| 5,927,210 | A | 7/1999 | Hacker |
| 5,967,345 | A | 10/1999 | Subotin |
| 5,988,469 | A | 11/1999 | Musacchia |
| 6,002,651 | A | 12/1999 | Baccaray |
| 6,029,938 | A | 2/2000 | Fava |
| 6,035,789 | A | 3/2000 | Ben-Haim |
| 6,041,919 | A | 3/2000 | Adams |
| 6,050,201 | A | 4/2000 | Blanchard |
| 6,062,522 | A | 5/2000 | Svegliato |
| 6,702,166 | B1 | 3/2004 | Niemivuo |
| 6,780,079 | B2 | 8/2004 | Musacchia |
| 6,902,463 | B2 | 6/2005 | Vaicunas |
| 6,955,582 | B1 | 10/2005 | Forbes |
| 6,991,829 | B2 | 1/2006 | Bergman |
| 7,021,825 | B1 | 4/2006 | Schultz |
| 7,351,898 | B2 | 4/2008 | Sagastegui |
| 7,458,875 | B1 | 12/2008 | Forbes |
| 2009/0214285 | A1* | 8/2009 | Cho ............... A45D 40/24 401/129 |
| 2010/0133268 | A1 | 6/2010 | Miller |
| 2010/0314414 | A9 | 12/2010 | Powers |

\* cited by examiner

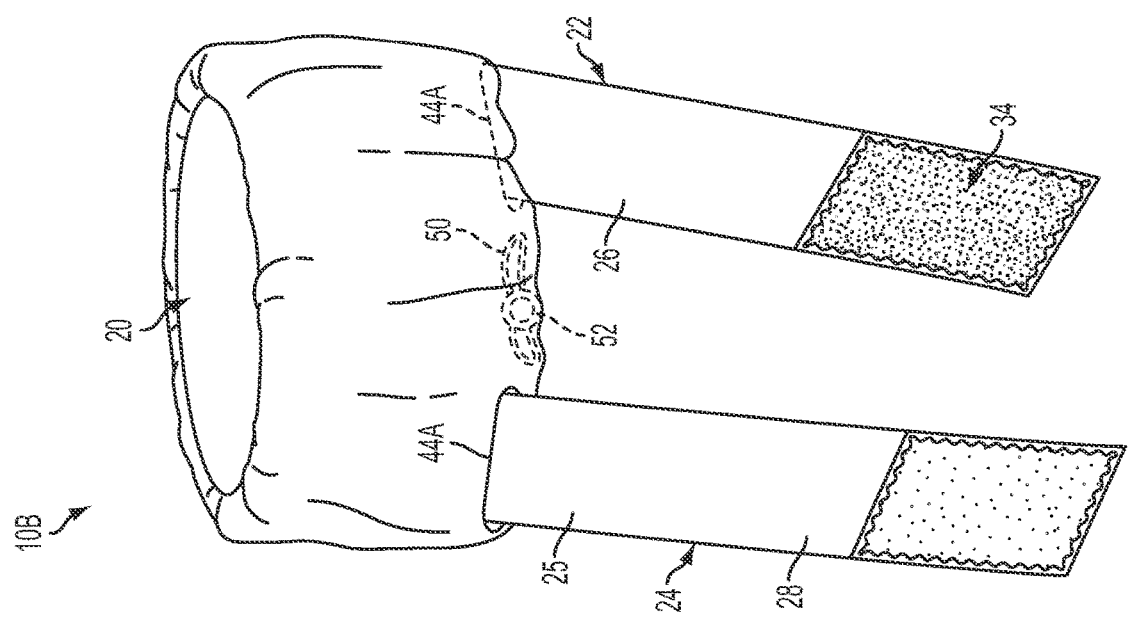
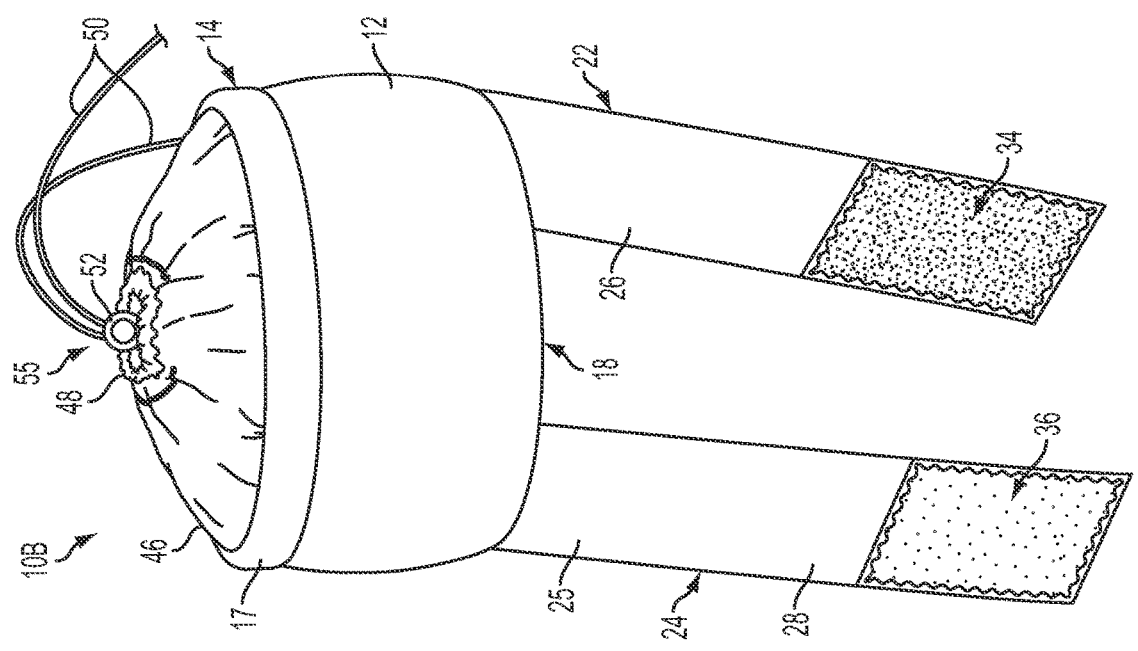

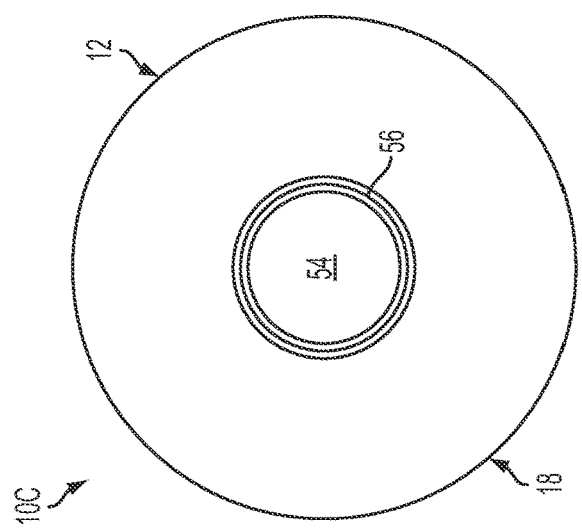
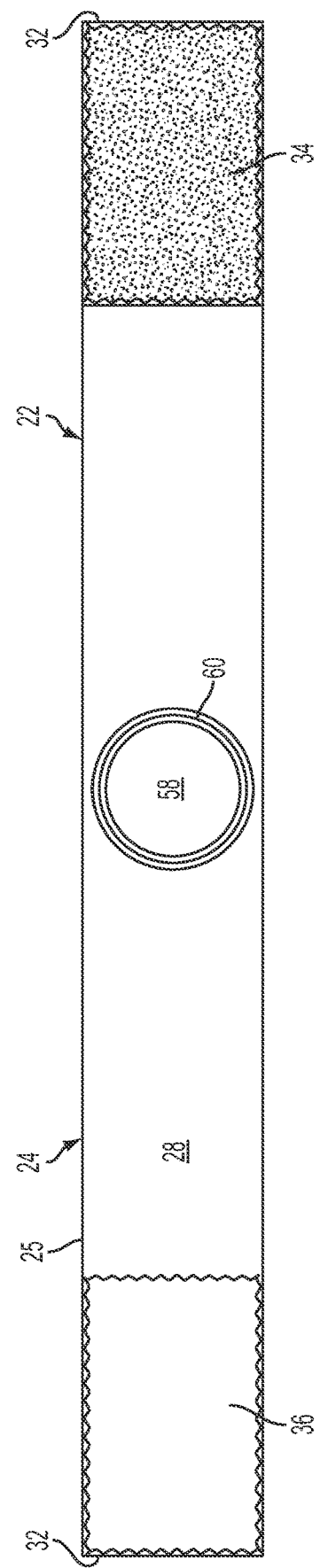
FIG. 10A
FIG. 10B

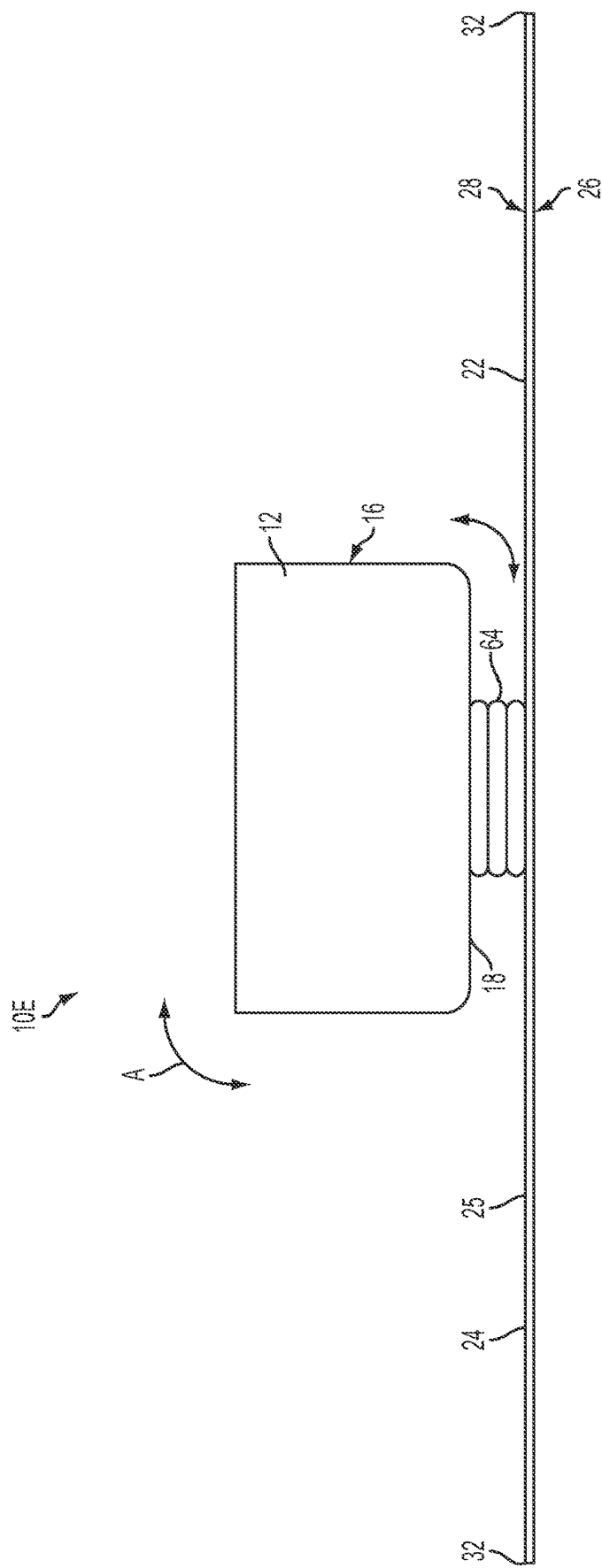

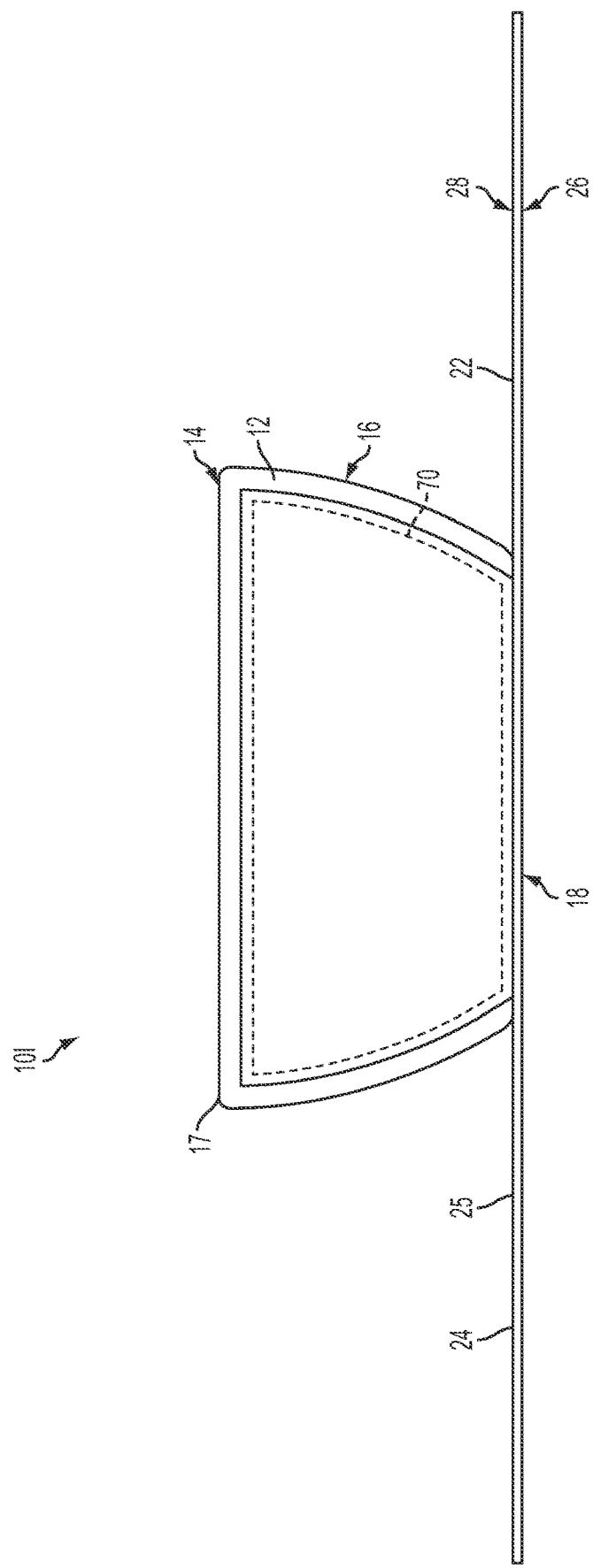

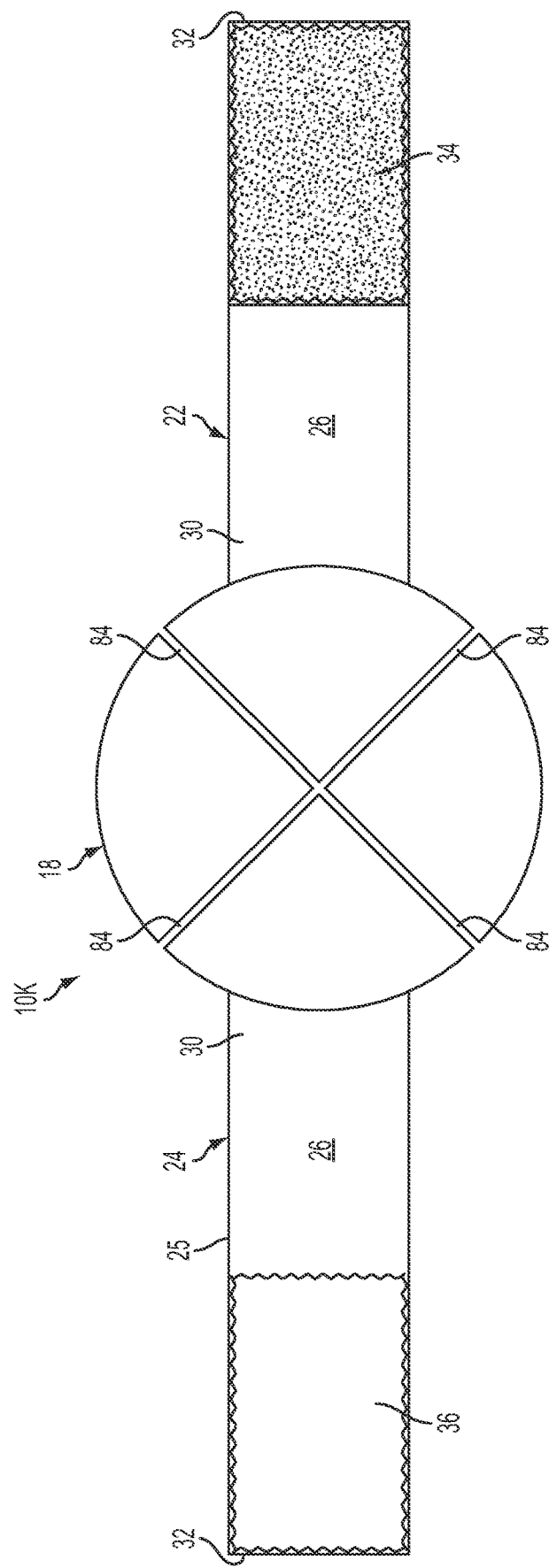

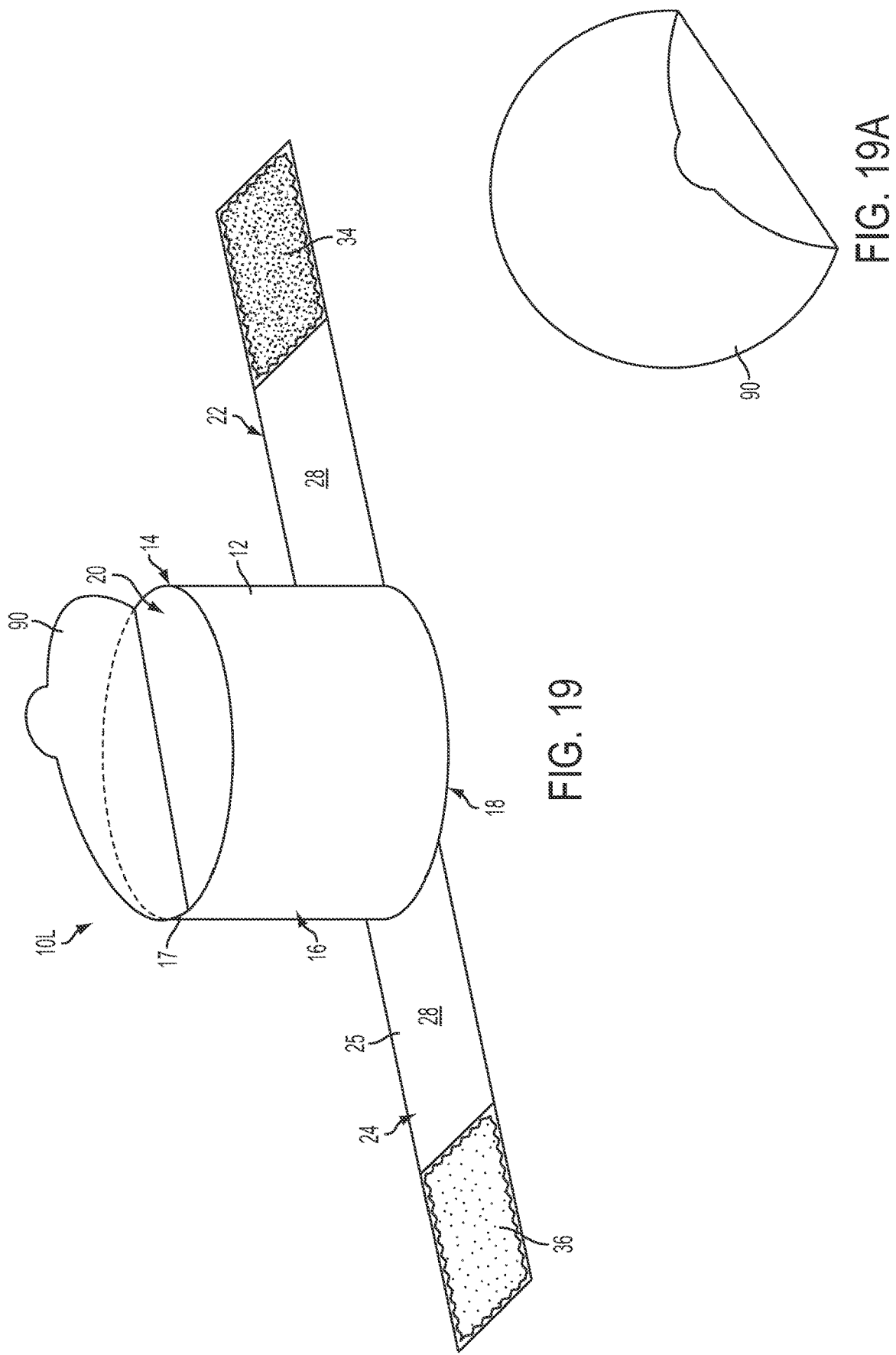

HOLDER WITH STRAP

CROSS-REFERENCE TO RELATED APPLICATIONS

This application is a continuation of U.S. patent application Ser. No. 15/925,641, filed Mar. 19, 2018, entitled "HOLDER WITH STRAP", which is a continuation of U.S. patent application Ser. No. 13/836,518, filed Mar. 15, 2013, entitled "HOLDER WITH STRAP" (which issued as U.S. Pat. No. 9,919,842 on Mar. 20, 2018), which are hereby incorporated herein by reference in their entirety.

BACKGROUND

Field

The present disclosure is generally related to a holder or receptacle.

Description of Related Art

Usually, while in a stroller or car seat, a young child is strapped down and held back by a harness. As a result, reaching for a bowl or holder for a food item, which is typically placed between their legs or beside them, can be awkward and/or extremely difficult for a child to reach, if not impossible.

Some devices have snack trays for holding food items. Depending on the position of the tray relative to the child, it can be difficult for the child to reach items on the snack tray, and can provide limited use or benefit. Snack trays can also be cumbersome, and are only useful when the child is strapped into the device (e.g., stroller or car seat) that has the tray. Holders that have suction devices need a surface to be suctioned to.

Further, when a snack tray is unavailable, placement of a bowl or holder can be difficult. Similarly, depending on how the child is strapped in, their eye-line could be compromised, thus affecting their ability to see food placed between their legs or beside them.

Any of these example situations can result in the child easily and/or accidentally knocking over—or even purposely throwing—the bowl or holder of the food item and/or spilling such contents. Also, known spill proof bowls are usually not secured in place, so a child could still drop or throw such bowls.

SUMMARY

It is an aspect of this disclosure to provide a food holding device including a food receiving receptacle member having a substantially pliable body with a top end and a bottom end and a surrounding wall extending therebetween. The surrounding wall can contain food within the receptacle member and the top end can allow access to food contained therein. A flexible strap is attached to the food receiving receptacle member. At least one end of the strap is connectible to secure the receptacle member to an object (e.g., a child or person).

One aspect provides that a flexible strap of a food holding device is secured substantially around a limb of a child or person.

The flexible strap can have a second end that is releasably connectible to the one end of the strap to secure the food receiving receptacle member to the object. In one aspect, the ends of the flexible strap can be configured to be overlappingly connected to secure the food receiving receptacle member to the object. In one aspect, the ends of the flexible strap could also or alternatively have cooperating elements thereon that are configured for connection and disconnection. Such cooperating elements may be hook and loop material, snap connectors, buttons, buckles, and clasps.

Another aspect provides a flexible strap that is sewn to the bottom of the food receiving receptacle member.

In one aspect of this disclosure, the food receiving receptacle member has a connector on its body and the flexible strap has a corresponding connector that is configured to removably connect with the connector of the food receiving receptacle member. In another aspect of this disclosure, the food receiving receptacle member has a threaded connector on its bottom end and the flexible strap has a corresponding threaded connector that is configured to removably connect with the threaded connector of the food receiving receptacle member.

The flexible strap may be made of elastic or resilient material.

In one aspect, the food receiving receptacle member is configured for receipt of a container or a removable insert. In another aspect, the top end of the food receiving receptacle member has a lip for containing the container or the removable insert.

In yet another aspect of this disclosure, the food receiving receptacle member is configured for receipt of a pre-packaged food container. In still another embodiment, the food receiving receptacle member is a pre-packaged food container.

In one aspect, at least the food receiving receptacle member is disposable.

Another aspect provides that the bottom end of the food receiving receptacle member has at least one opening therein, and at least one end of the flexible strap extends through the at least one opening.

Yet another aspect provides that the body of the food receiving receptacle member further includes a liner material therein. In one aspect, the liner material is provided in the body to support the bottom end and surrounding wall of the food receiving receptacle member.

In still yet another aspect of this disclosure, the food holding device further includes a closure that can restrict access to the top end of the body to assist in containing food within the food receiving receptacle member. The closure can be a lid or a drawstring, in accordance with additional aspects of this disclosure.

Another aspect of this disclosure provides a device having: a receptacle member including a body having a top end and a bottom end and a surrounding wall extending therebetween, the surrounding wall configured to contain one or more items within the receptacle member and the top end configured to allow access to the one or more items contained therein; the bottom end of the receptacle member comprising a pair of slits therein; and a flexible strap removably attached to the receptacle member through the pair of slits in the bottom end of the receptacle member. At least one end of the flexible strap is connectible to secure the food receiving receptacle member to an object.

Still another aspect provides a food holding device having: a pre-packaged, food receiving receptacle member having a body having a top end and a bottom end and a surrounding wall extending therebetween, the surrounding wall configured to contain food within the receptacle member and the top end configured to allow access to food contained therein; a removable lid on the top end of the receptacle member; and a flexible strap attached to or removably attached to the receptacle member. The receptacle member has at least one connection device on the body for removable attachment with the flexible strap, and at least one end of the flexible strap is connectible to secure the receptacle member to an object. The receptacle member can be a pre-packaged container. In one aspect, at least the receptacle member is disposable.

In one aspect of this disclosure, the food receiving receptacle member is disposable. In another aspect, the removable lid and/or the flexible strap are disposable. In yet another aspect, the removable lid and the flexible strap are also disposable in addition to the food receiving receptacle member.

Other aspects, features, and advantages of the present disclosure will become apparent from the following detailed description, the accompanying drawings, and the appended claims.

BRIEF DESCRIPTION OF THE DRAWINGS

FIGS. 8A and 8B are closed and open positions of a receptacle member in accordance with another exemplary embodiment.

FIG. 10A is a bottom view of a receptacle member in accordance with yet another exemplary embodiment.

FIG. 10B is a top view of a strap that can be used with the receptacle member of FIG. 10A.

FIG. 12 is a side view of a receptacle member in accordance with another exemplary embodiment.

FIG. 16 is a side view of the container of FIG. 15C within the receptacle member of FIG. 15A in accordance with another exemplary embodiment.

FIG. 18 is a bottom view of a receptacle member in accordance with an embodiment.

FIG. 19 is a perspective view of a receptacle member in accordance with another embodiment.

FIG. 19A is a top view of an exemplary lid for use with a receptacle member, such as shown in FIG. 19.

DETAILED DESCRIPTION OF THE PREFERRED EMBODIMENT(S)

Described and shown in the exemplary embodiments is a portable, food holding device or accessory that is designed to facilitate access to food contents while a child or children is/are in a seated position, for example. The device can be secured to a limb of the child (e.g., leg) or person to prevent a food receptacle from tipping over (thus causing the contents to spill out) or slipping off the limb. The ease of repositioning the device along the limb (e.g., a thigh of the leg, a calf, a shin, or another object) provides a child or person with easy access to food contents held therein (e.g., based on their limited reach) and aids in the blind retrieval of food. For example, while in a seated position, the attachment of the device to his or her thigh aids in the ability to snack or eat in a comfortable, secure and convenient way. Also, because the food receptacle is strapped to the child or person, it also allows their hands to be free.

Figure 5:
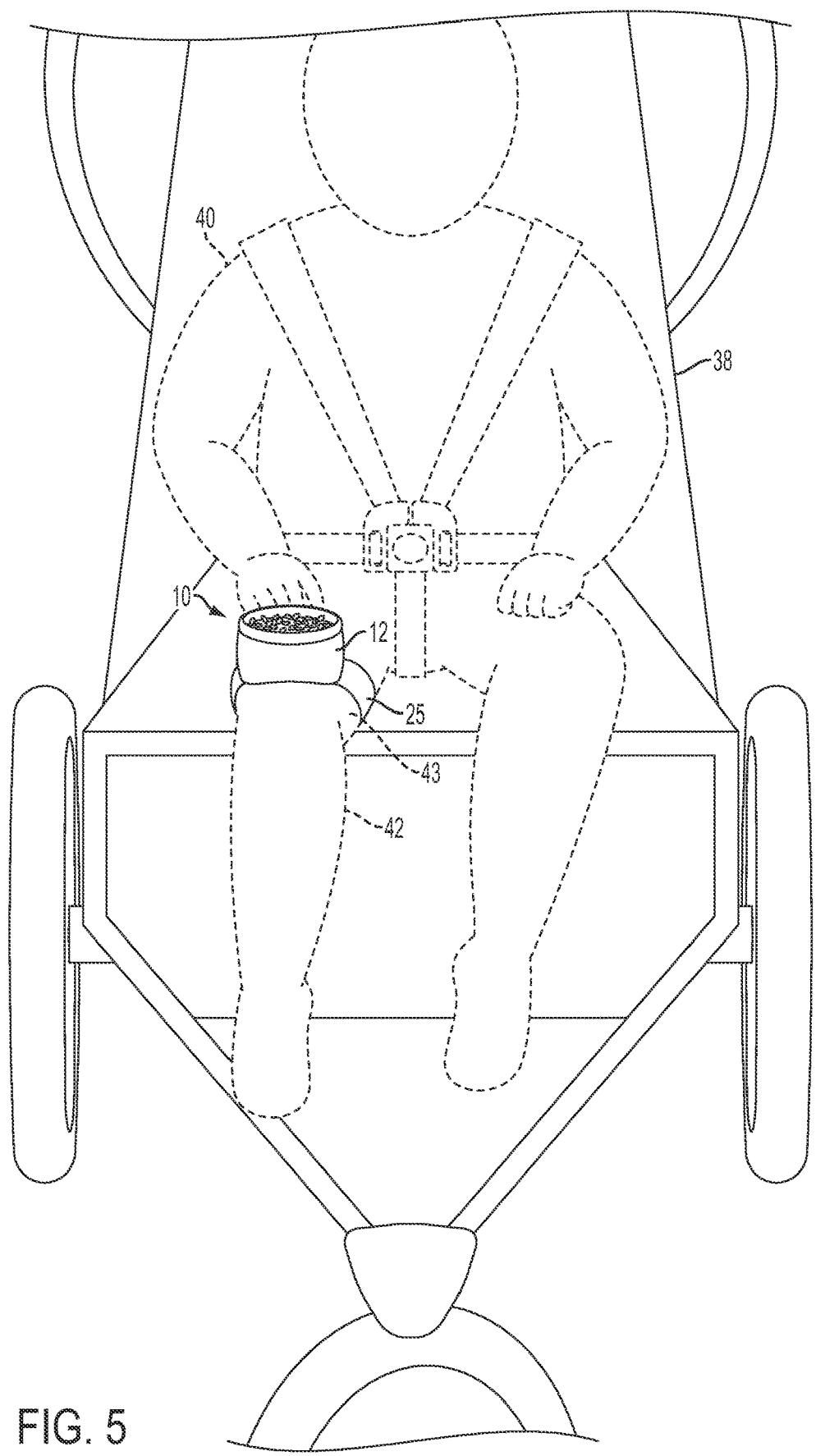
FIG. 5 is an example of the receptacle member of FIG. 1 in use.
Figure 6:
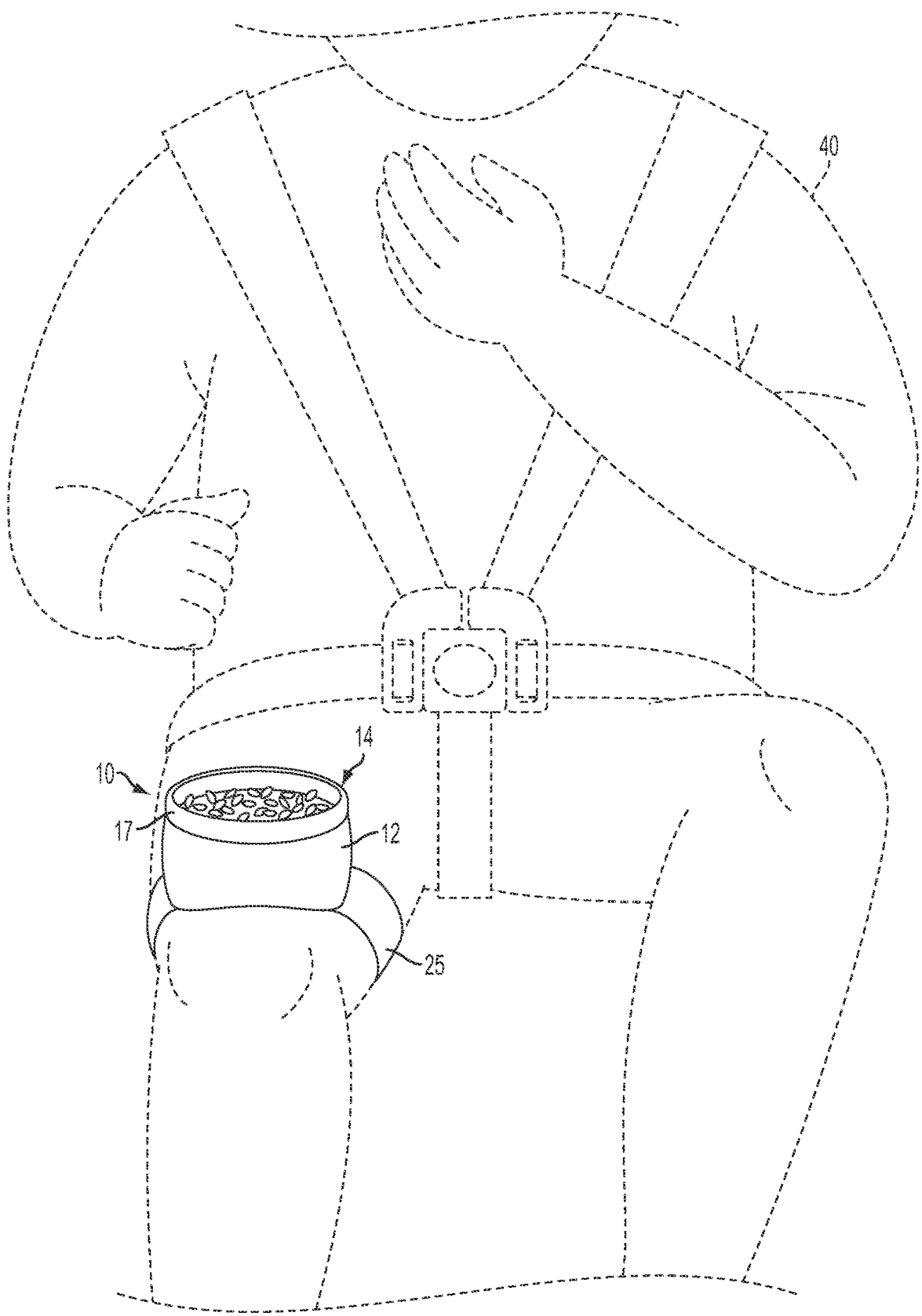
FIG. 6 is a detailed view of FIG. 5 of the receptacle member in use.
Figure 7:
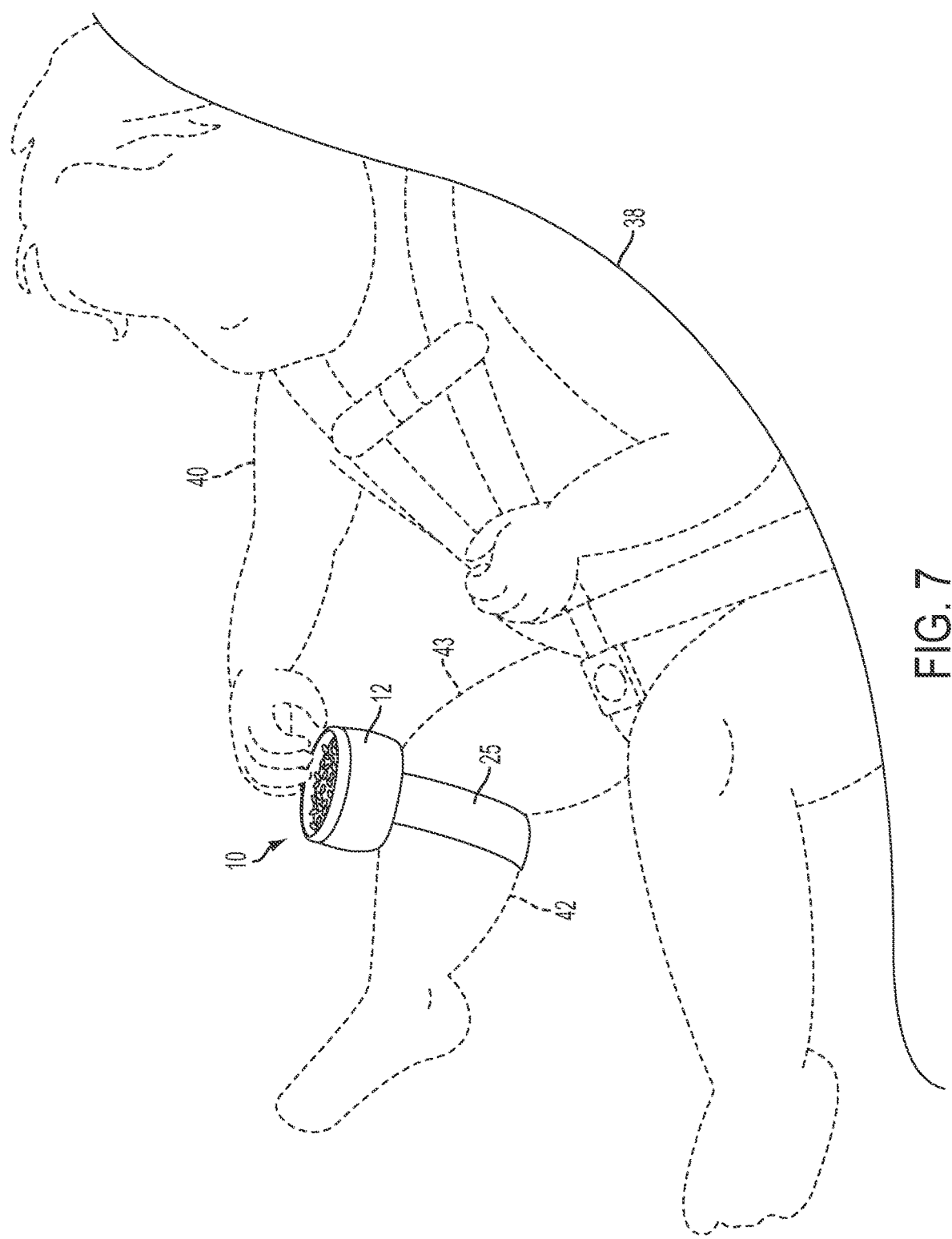
FIG. 7 is a side view of the receptacle member in an alternative use.

Although the exemplary embodiments shown herein may be referenced as being attached to a child's limb (e.g., thigh), such as shown in FIGS. 5 and 6, it should be understood that the device may be attached to any person such as an adult and/or any number of areas of a person's body or around other body parts. For example, as shown in FIG. 7, the food receptacle may be attached to another part of a leg, such as the calf or shin. Alternatively, the receptacle may be attached to an arm or wrist of a person. In another example, the device may be secured to a limb (e.g., thigh) of an adult. Also, if a child sits on an adult's lap, for example, while the device is attached to the leg of an adult, the child can access the food and stay occupied while the adult has both hands free. This would be especially beneficial on airplanes, at concerts, etc. Use for adults may be independent of children all together and may include but not be limited to: eating solution for persons in wheelchairs, snacking at concerts or other events, snacking while seated in a boat such as a canoe, snacking while seated in a car, etc.

In yet another embodiment, the receptacle can be positioned around an inanimate object, including, but not limited to, a car seat, a stroller, a cart (e.g., shopping cart or grocery cart), a wagon, a push car, a chair, etc., such as an arm or similar part thereof.

FIGS. 1-4 illustrate one exemplary embodiment of a portable, food holding device 10 for holding food contents. Food holding device 10 includes a food receiving receptacle member 12 having a substantially pliable body that has a top end 14 and a bottom end 18. The top end 14 is configured to allow access to food contained within the receptacle member 12. Bottom end 18 includes a base portion 21 that aids in supporting the food contents. It can also be used for attachment of a securement member, such as a flexible strap 25, described below. A surrounding wall 16 extends between the top end 14 and the bottom end 18. The surrounding wall 16 of the receptacle member 12 is an upstanding wall that is configured to contain food within the receptacle member 12. More specifically, the surrounding wall 16 forms an internal cavity 20 with a base portion 21 configured to receive and support food contents that are placed in the receptacle member 12. The surrounding wall 16 may be substantially void of openings to prevent food items from falling out of the receptacle member 12.

The receptacle member 12 may be made using any number or combination of fabrics or materials (e.g., silicone, fabric, plastic(s), fabrics or materials with coatings, or a combination thereof). Its parts may be formed from the same material, for example. Alternatively, the parts of the receptacle member 12 can be made of different materials. For example, in an embodiment, the bottom end 18 may be formed using a first material and the surrounding wall 16 may be formed using a second material, the second material being different from the first material. The receptacle member 12 may be formed from a substantially pliable material but may also be made of rigid, disposable, reusable, and/or recyclable materials. It may be compactable. The receptacle member 12 may be formed from a collapsible material that allows for at least the receptacle member 12 to be substantially flattened and compact when not in use. The receptacle member 12 may or may not be waterproof. The receptacle member 12 may contain insulated properties or made from an insulating material to keep food contents hot or cold.

Figure 1:
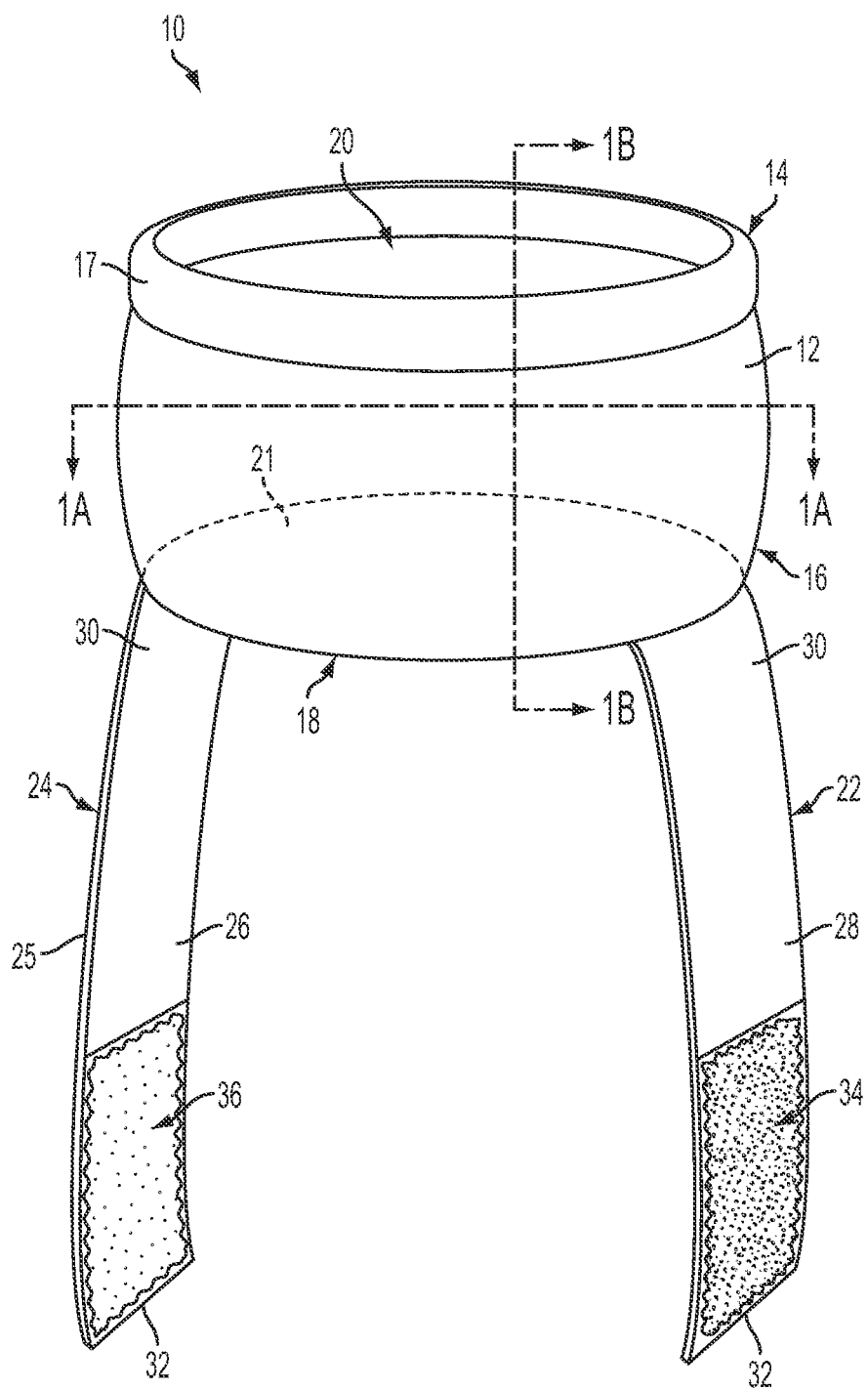
FIG. 1 is a side perspective view of a receptacle member with straps in an open position in accordance with one exemplary embodiment.

In accordance with an embodiment, the receptacle member 12 of FIG. 1 is formed from disposable and possibly recyclable materials. In another embodiment, the receptacle member 12 is a pre-packaged item.

The top end 14 of the receptacle member 12 may include an edge, a ridge, or a lip 17, for example. The lip 17 may be formed from similar materials as the receptacle member 12, for example. Alternatively, different materials may be used. In an embodiment, the lip 17 is formed by folding and overlapping a portion of the material used to form the surrounding wall 16.

In an embodiment, the food receiving receptacle member 12 has a generally cylindrical shape. However, other shapes, such as ovular, rectangular, square, and the like are also within the scope of this disclosure.

The food holding device 10 also includes a flexible strap 25 that is attached to the food receiving receptacle member 12. The flexible strap 25 has at least one first end that is connectible to secure the receptacle member 12 to a child or an object. In an embodiment, the flexible strap 25 is secured substantially around the object (e.g., around a limb). The flexible strap 25 has an internal side 26 or underside (e.g., for contacting a person) and an external side 28. However, the sides 26 and 28 may be reversible. In some embodiments, the strap 25 has a second end that is releasably connectible to the first end of the strap to secure the receptacle member 12. In one embodiment, the flexible strap 25 may be provided in the form of two (or more) straps designed to connect and thus secure the receptacle member 12 relative to the child or object. In still another embodiment, the flexible strap 25 may be a single piece of elastic or resilient material without an open end 32. For example, the strap 25 may be configured to slip on or off of an object (e.g., chair or seat) or a limb (e.g., thigh, arm or wrist).

The flexible strap 25 can be connected or attached or removably connected or attached to the receptacle member 12 in any number of areas. In one embodiment, it attaches to or removably attaches to the bottom of the food receiving receptacle member 12. In another embodiment, it attaches to or removably attaches to the side of the food receiving receptacle member 12. In yet another embodiment, the food holding device 10 is configured such that flexible strap 25 is connectable to more than one area such that a user has an option to select an attachment location of the flexible strap 25 to the device. For example, the flexible strap 25 may be connectable to the bottom and/or connectable to the side of the receptacle member 12.

In the illustrated exemplary embodiment of FIGS. 1-4, the flexible strap 25 is provided in the form of a first strap 22 and a second strap 24 that are attached at one end 30 to the receptacle member 12 and configured for removable connection at a second end 32. Each strap 22 and 24 has an internal side 26 and an external side 28. In an embodiment, the ends 30 of each strap 22 and 24 are attached to the bottom 18 and/or surrounding wall 16 of the receptacle member 12 at a connection area 31 (see FIG. 4). In one embodiment, the ends 30 of the straps 22 and 24 are sewn or woven at connection area 31 to the receptacle member 12. Alternatively, other attachment methods for attaching or removably attaching the strap 25 (or 22 and 24) to the receptacle member 12 may be used, including, but not limited to, adhesive, bonding, insertion through a body (e.g., slits), snaps, buttons, and Velcro®.

Figure 2:
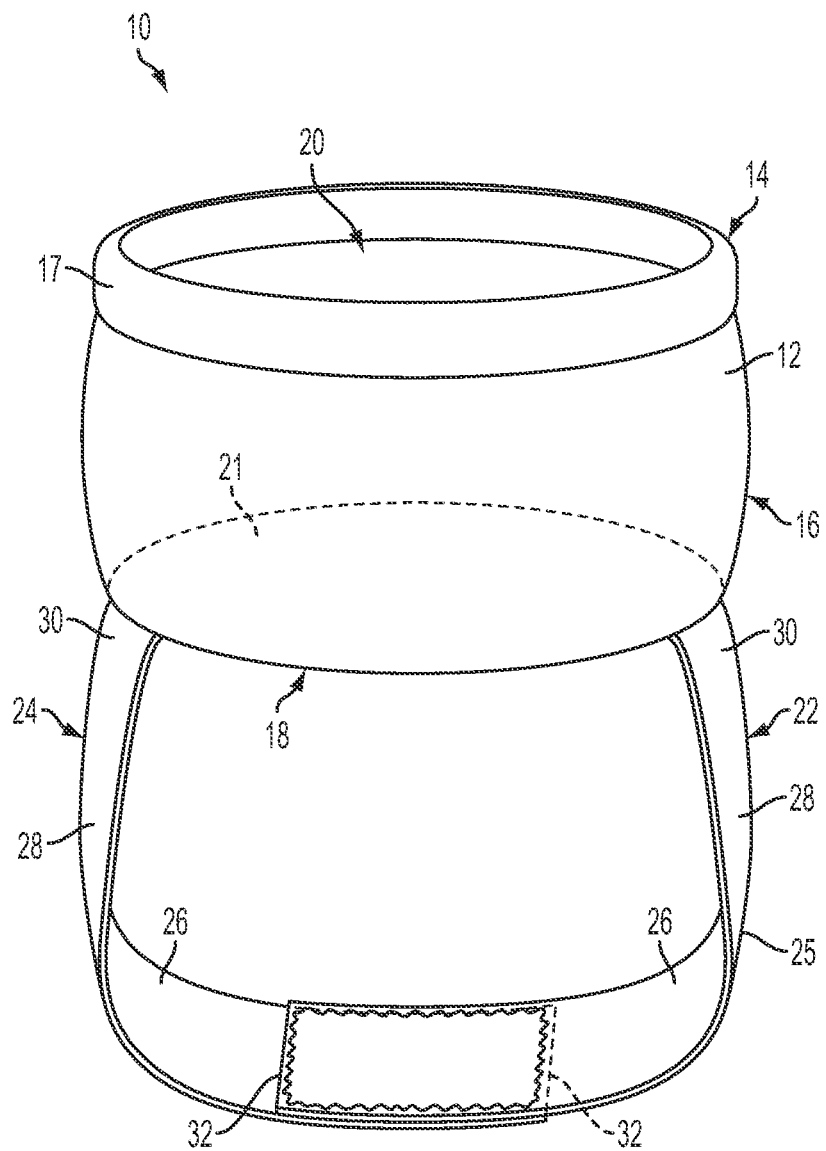
FIG. 2 is a side perspective view of the receptacle member 12 of FIG. 1 with the straps in a closed position.
Figure 3:
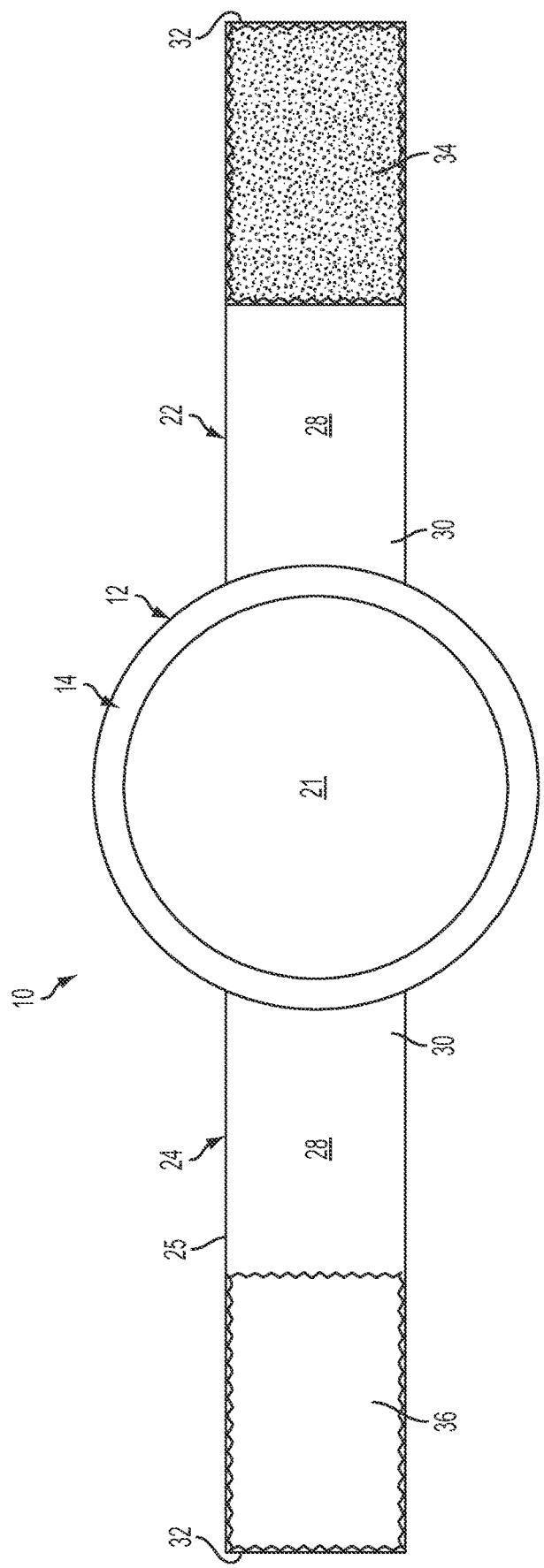
FIG. 3 is a top view of the receptacle member of FIG. 1.
Figure 4:
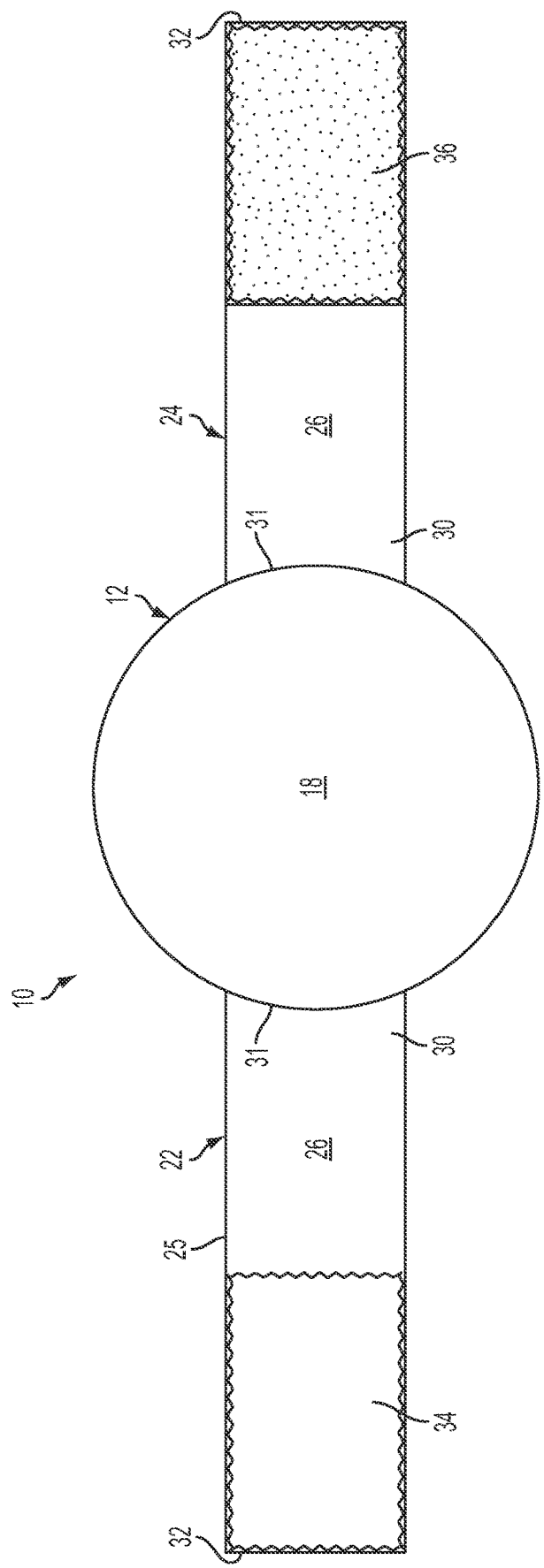
FIG. 4 is a bottom view of the receptacle member of FIG. 1.

The end 32 of the second strap 24 may be releasably connectible to the end 32 of the first strap 22. FIG. 1 shows the straps 22 and 24 in a first, open position, while FIG. 2 shows the straps 22 and 24 in a second, closed position. The ends 32 of the straps 22 and 24 may have cooperating connection elements 34 and 36 respectively thereon that are configured for connection and disconnection. In one embodiment, as shown in FIG. 2, the ends 32 of the flexible strap 25 are configured to be overlappingly connected to secure the receptacle member 12. For example, in accordance with one embodiment, the first strap 22 may include a first cooperating element 34 on its external side 28, and the second strap 24 may include a second cooperating element 36, configured for connection with first cooperating element 34, on its internal side 26. This can result in an overlapping connection. The amount of overlap is not meant to be limiting. In another embodiment, the cooperating connection elements can be provided on the same side of the straps (e.g., both on the internal sides 26 of straps 22 and 24). In yet another embodiment, the cooperating elements may be configured to attach to the ends 32 of the straps 22 and 24, and may or may not extend from the ends 32.

In an embodiment, the cooperating elements 34 and 36 used to connect straps 22 and 24 can be hook and loop material (e.g., Velcro®). Alternatively, cooperating connection elements such as, but not limited to, elastic materials (e.g., Velstretch®), snap connectors, buttons, buckles, and clasps, can be used to connect the straps 22 and 24.

Figure 23:
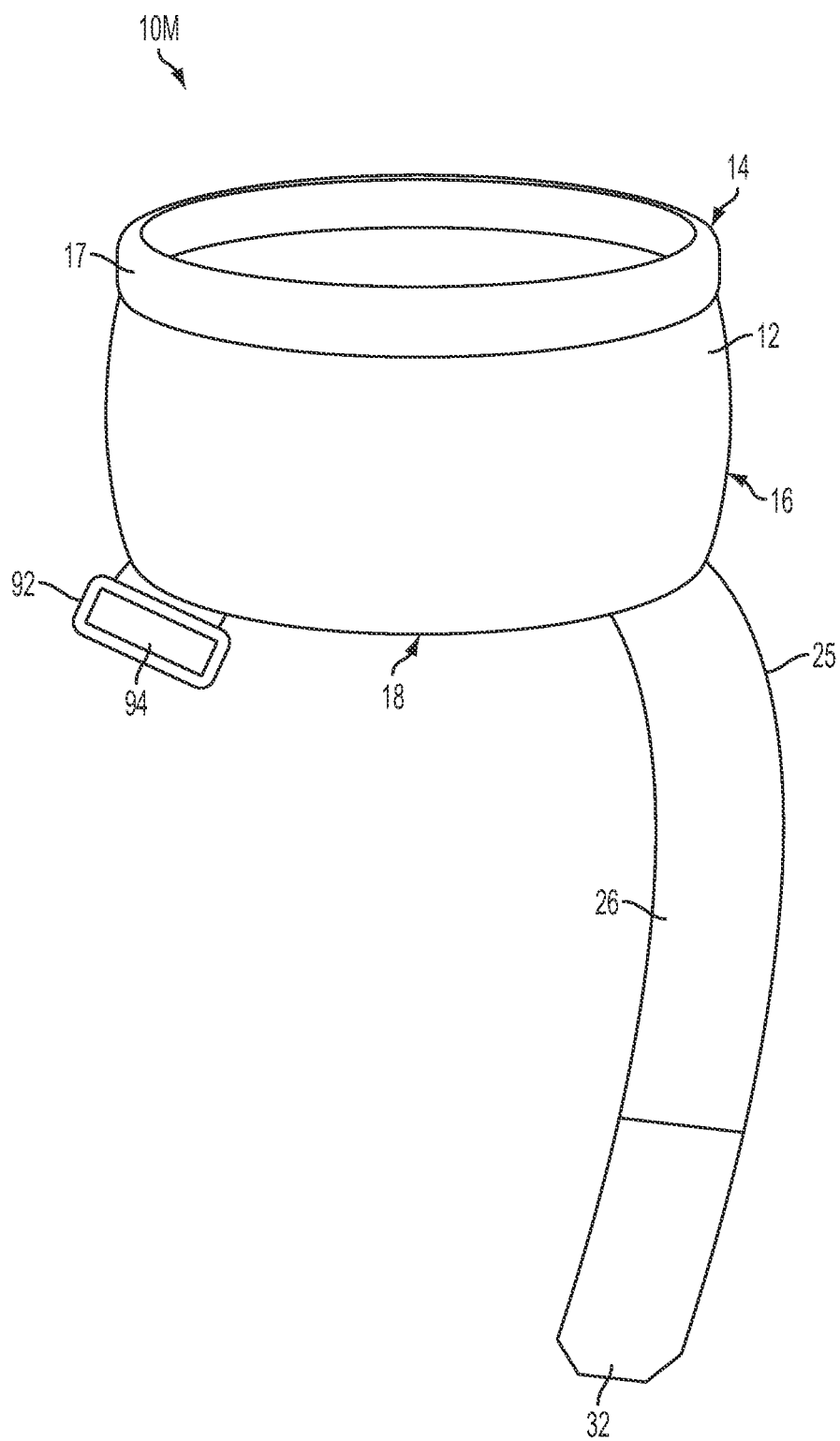
FIG. 23 is a perspective view of a food holding device in accordance with still yet another embodiment.

FIG. 23 illustrates another embodiment of a food holding device 10M having a receptacle member 12 and a flexible strap 25 attached thereto. Specifically, in this embodiment, one end 32 of the flexible strap 25 is connectible to a part of the device to secure the food holding device 10 to a child or object. In an embodiment, the flexible strap 25 is secured substantially around the object (e.g., around a limb). For example, the receptacle member 12 may include a fastener 92 with an opening 94 configured for receipt of the end 32 therethrough. The end 32 of the strap 25 can be secured or connected in any number of ways. Similar features as previously described are also labeled in FIG. 23 and are therefore not repeated here.

In an embodiment, the flexible strap 25 is formed from a material having elastic and connective properties (e.g., Velstretch®). For example, the internal or underside 26 of the flexible strap 25 may be positioned on an object. After the flexible strap 25 is wrapped around an object, its end is fed through the opening 94 of fastener 92. At least the end 32 of the strap 25 can be folded back and looped over for overlapping such that the end 32 is attached to the external side 28 (not shown in FIG. 23) of the flexible strap 25. The strap 25 can be tightened as desired.

In accordance with one embodiment, the food holding device 10 in its entirety is a pre-packaged item, and may be a disposable product. In another embodiment, one or more parts of the food holding device 10 are pre-packaged and/or disposable (e.g., receptacle member 12 and/or flexible strap 25). For example, at least the receptacle member 12 can be disposable. In another embodiment, one or more parts of the food holding device 10 are reusable and/or recyclable (e.g., receptacle member 12 and/or flexible strap 25). For example, the flexible strap 25 may be configured for attachment with different types of receptacle members and/or containers.

FIGS. 5 and 6 show an example of the food holding device 10 of FIGS. 1 and 2 in use by a child 40 in a seated position in a carrier 38, such as a stroller. As previously noted, the device 10 can be strapped around a thigh 43, for example. FIG. 7 shows another exemplary view of the device 10 in use by a child 40 in a carrier 38 in the form of a car seat. When the child 40 is placed in such a carrier, the child 40 may be provided at an incline, especially when the car seat is rear facing. Accordingly, the food holding device 10 can be positioned to better accommodate the angle of the child in the carrier 38. For example, as shown in the Figure, the food holding device 10 may be positioned below the knee, e.g., on the calf 42 or shin of the leg of the child 40. The food holding device 10 may alternatively be positioned on a thigh 43 of the child when in a car seat.

The flexible strap 25 may be formed from any number of materials and are not limited. In an embodiment, the flexible strap 25 (or straps 22 and 24) is formed from an elastic or stretchable material. The materials for flexible strap 25 may be resilient and/or configured to stretch to accommodate the object to which it is secured.

In accordance with an embodiment, the body of the food receiving receptacle member 12 further comprises a liner 13. The liner 13 may be provided in or on the body of the receptacle member 12. The liner 13 can be provided to line the bottom end 18 and/or surrounding wall 16 of the receptacle member 12. For example, in accordance with an embodiment, liner 13 is configured to be placed within at least the cavity 20 inside of the receptacle member 12. The liner 13 may cover at least part of its inner surfaces, i.e., at least part of the surrounding wall 16, the base portion 21 of bottom end 18, or both, on at least an inside of the receptacle member 12 configured to receive an food item therein. A lip 17 may or may not be lined.

Figure 1A:
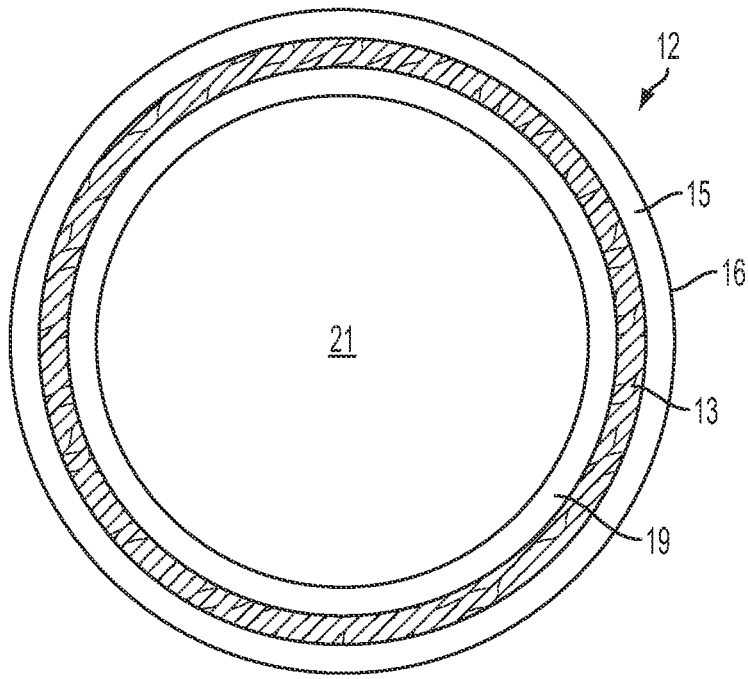
FIGS. 1A and 1B illustrate cross sectional views of FIG. 1 as indicated by 1A-1A and 1B-1B.

In another embodiment, the liner 13 is configured to be provided within the surrounding wall 16 and/or bottom end 18. The liner 13 can provide structural support to the bottom end 18 and/or surrounding wall 16 of the receptacle member 12. For example, such features can be seen in the cross sections taken along lines 1A-1A and 1B-1B. As shown in detail in FIGS. 1A and 1B, the liner 13 may be provided between layers of material used to form the receptacle member 25. FIG. 1A shows a cross-sectional view illustrating the layers that can be used to form the surrounding wall 16, in accordance with one embodiment. As shown the surrounding wall 16 may include a first, outer layer 15 of material and a second, inner layer 19 of material. In this illustrated exemplary embodiment, a layer of material in the form of a liner 13 is provided between layers 15 and 19. The liner 13 can act as a support between the layers 15 and 19 to form the upstanding surrounding wall 16.

The liner 13 may be formed from an interfacing material, for example, a waterproof material, or any other type or combination of materials. The layers 15 and 19 may be made of the same material or different materials. In an embodiment, the liner 13 and layers 15 and 19 may be made from the same materials. As previously noted, any number of fabrics or materials may be used to form the parts of the receptacle member 12, including one or more parts of the surrounding wall 16 and/or liner 13, including one or more layers of materials that are substantially pliable, rigid, disposable, recyclable, reusable, compactable, collapsible, elastic, resilient, waterproof, or insulating. The construction of the layer(s) of material(s) used to form the surrounding wall 16 and/or liner 13 is not limited to those shown in FIGS. 1A and 1B, however.

Figure 1B:
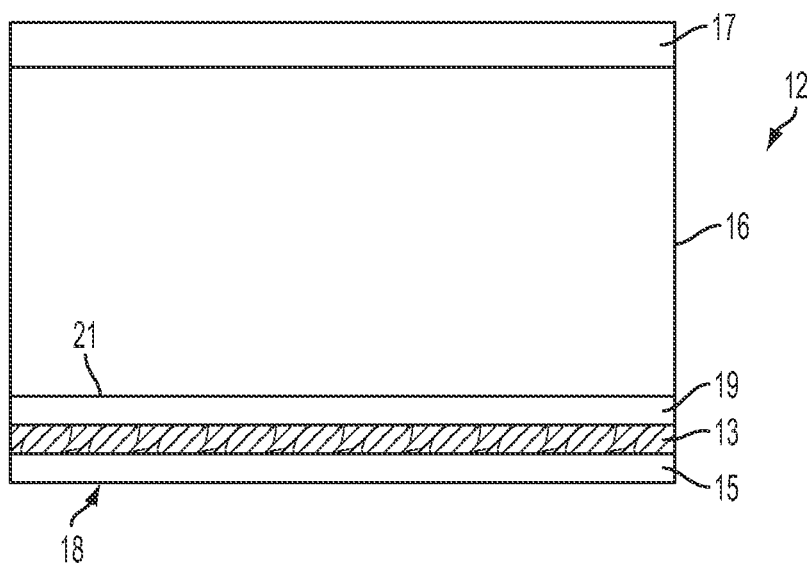

Of course, it should be understood by one of ordinary skill in the art that the illustrations in FIGS. 1A and 1B are for illustrative purposes, and that such features are exaggerated for explanatory purposes only. The illustrated embodiments should not be limited by dimension, shape, or manufacturing based on the embodiments shown in FIGS. 1A and 1B.

In an embodiment, the flexible strap 25 is configured to be adjustable. The flexible strap 25 could be of varying lengths to accommodate different sized objects for securement thereto. The strap or straps could be one size or they could contain the ability to allow them to be lengthened or shortened as desired. In another embodiment, the flexible strap 25 may include an extension piece (not shown) which is configured to lengthen the overall length of the strap 25 so that the receptacle member 12 can be positioned and secured to a person or object (e.g., a leg of an adult is larger than a leg of a child). In yet another embodiment, a second strap (not shown) may be attached to the flexible strap 25.

The receptacle member 12 can vary in size and is not limited to the depictions shown in FIGS. 1-7. In an embodiment, the receptacle member 12 may be reversible. For example, the receptacle member 12 may be manufactured with one material of a first color or first design on the inside cavity 20 and a second, different material of a second color or second design on its outer sides. As another example, the receptacle member 12 may be formed with materials configured to accommodate wet or dry food items. The flexible strap 25 may be configured to be removably attached to the receptacle member 12. Accordingly, a user may be provided with an option for turning the receptacle member 12 inside-out that allows for use of the receptacle member 12 in both positions to hold food and secure the receptacle member 12 using the flexible strap 25.

The receptacle member 12 may or may not include a closure configured to contain food within the receptacle member 12. The closure can substantially or completely close or seal food items within the cavity 20 of the body. The closure may be configured to restrict access to contents within the cavity 20 at the top end 14 of the body, for example. It may be attached to or detached from the receptacle member 12. The closure may be in the form of a lid or drawstring.

FIGS. 8A and 8B are closed and open positions, respectively, of one embodiment of a receptacle member 12 of a food holding device 10B. Similar features as previously described are also labeled in FIGS. 8A and 8B and are therefore not repeated here. A closure 55 is associated with a receptacle member 12. The closure 55 can be provided in the form of a piece of material 46, liner, or insert, for example, provided with a drawstring 50. The material 46 may be attached to the inside cavity 20 or the top end 14 of receptacle member 12, for example. An opposite, open end 48 of the material allows for access into cavity 20. The opposite, open end 48 may include an opening or slit that extends around a circumference of the open end that is configured to receive the drawstring 50. In an embodiment, included on the drawstring 50 is a fastener 52. The fastener 52 can be releasably locked along the drawstring 50. The drawstring 50 may be fed through the fastener 52. For example, in an embodiment, the ends of the drawstring 50 can be pulled through the fastener 52, thereby pulling the open end 48 of the material 46 taut into a closed position, as shown in FIG. 8A. The fastener 52 may be moved towards the taut end 48 along the drawstring 50 and locked in place. Alternatively, a fastener need not be used. Rather, the end of the drawstring 50 can be tied into a releasable bow or knot to maintain the ends 48 of the material 46 in its closed position.

In one embodiment, the end 48 of the material 46 may be opened up and pulled down around an outside of the receptacle member 12, as shown in FIG. 8B, for example. This can result in an open top and access to food within cavity 20. The material 46 can be pulled taut around the bottom end 18 of receptacle member 12 by tightening the drawstring 50 and securing it under the bottom end 18 (e.g., via a knot or fastener 52). In one embodiment, the drawstring 50 (and/or its fastener 52) can be tucked between the material and receptacle member 12 to become hidden.

In an embodiment, the material 46 may include one or more slits 44A adjacent its open end 48 and configured for receipt of the flexible strap 25. The flexible strap 25 may be fed through the one or more slits 44A of the material 46 when the material 46 is folded downwardly and secured around the bottom end 18 of the receptacle member 12, for example.

Alternatively, it should be noted that the closure 55 can be used with alternate configurations of the receptacle member 12 and the flexible strap 25. The attachment location(s) of the flexible strap 25 on or with the receptacle member 12 should not limit the use or addition of the closure 55 to the receptacle member 12. Further, slits 44A need not be provided to accommodate the straps 22 and 24 of the flexible strap 25. Moreover, the drawstring 50 should not be limited to being pulled taut under the bottom end 18, as shown in FIG. 8B. As an example, it is envisioned that the open end 48 of the closure 55 can be folded downwardly around the surrounding wall 16 of a receptacle member 12 and secured in its open position by tightening the drawstring 50 around a bottom part of the surrounding wall 16 (e.g., which can be near but not necessarily underneath the bottom end 18).

Variations of the closure 55 may include, but are not limited to: a material or lid that secures to the opening or top end 14 of the receptacle member 12 with a cinch top drawstring, elastic, zipper, hook and loop material, button(s), screw top, snap, loop enclosure, clasp, hook, flaps, laces, D-Rings, etc. The closure could alternatively be a spill-proof lid whereby the material used to form the lid has slits that allow a hand to enter through it to retrieve the food within cavity 20, but is sturdy enough to keep the food contained inside the receptacle member 12. A spill-proof lid may be an attached part of the structure, or detachable. FIGS. 19A and/or 22 illustrate examples of types of lids that can be used with this or any of the other embodiments in accordance with this disclosure.

Further, it is noted that although the flexible strap 25 is shown as having two straps 22 and 24 in FIGS. 1-4 that are attached to receptacle member 12, such a depiction is not meant to be limiting. As shown in the additional Figures and described below, the flexible strap 25 may be a single strap formed from a single piece of material with ends 30 and 32 that are designed for connection (e.g., by wrapping the single piece of material around an object and overlapping the ends).

Figure 9:
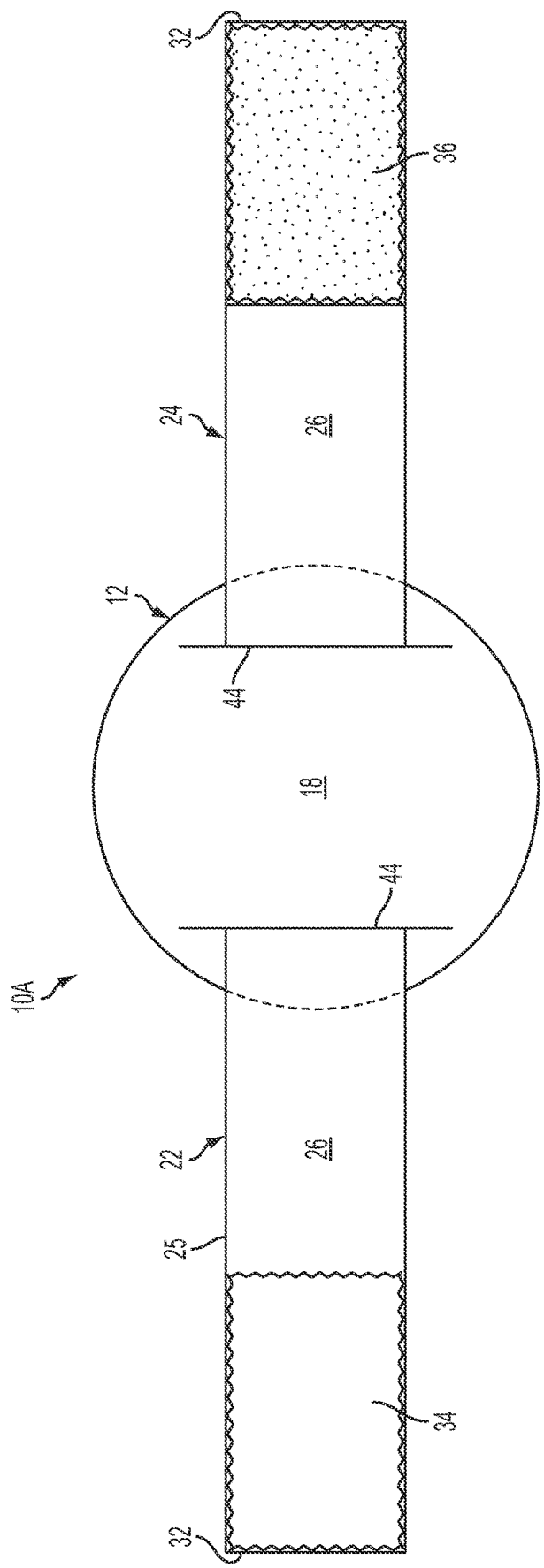
FIG. 9 is a bottom view of a receptacle member in accordance with another exemplary embodiment.

FIG. 9 illustrates a bottom view of a receptacle member 12 used with a food holding device 10A in accordance with another exemplary embodiment. Similar features as previously described are also labeled in FIG. 9 and are therefore not repeated here. In this example, the receptacle member 12 and the flexible strap 25 are configured for detachment from each other. The flexible strap 25 is provided as a single-piece member with opposing ends 32. Detachment allows for interchangeable receptacle members and/or interchangeable straps, as well as for the ability to reverse the receptacle member 12 (e.g., described above) and/or strap 25. For example, the strap 25 may be flipped such that its underside 26 is visible on the exterior and its external side 28 is provided on the interior (e.g., for contacting a person).

As shown in FIG. 9, in this example the bottom end 18 of the food receiving receptacle member 12 has at least one opening 44 therein, and at least one end of the flexible strap 25 extends through the at least one opening 44. In FIG. 9, two openings 44 or slits are provided in the bottom end 18. The detachable, flexible strap 25 can be fed through the one or more openings 44 in the bottom of the receptacle member 12. In an embodiment, the flexible strap 25 can be pushed or pulled through the at least one opening 44 such that the receptacle member 12 is provided near or adjacent a middle or center of the length of the flexible strap 25. When the strap 25 is attached to the receptacle member 12, then, it can be positioned to form a first side 22 and a second side 24 of the strap 25 that are configured for positioning and securement to and/or around a child or an object. In another embodiment, the flexible strap 25 can be attached to the receptacle in such a manner that one of its ends 32 is connectible to secure the receptacle member 12 to the child or object.

In one embodiment, the flexible strap 25 is configured to attach using opening(s) 44 or slits that are provided on the side of the surrounding wall of the receptacle member 12, in addition to or alternative to the openings 44 on the bottom end 18.

In another embodiment, the opening(s) are provided through one or more loops whose ends are attached to the bottom end 18 or side(s) of the receptacle member 12. The loop(s) can be in the form of extra material that are attached (e.g., sewn) to the receptacle member 12, or formed in combination with the receptacle member 12. The flexible strap 25 may be configured to feed through the one or more loops on the receptacle member 12.

The method for attaching and detaching the receptacle member 12 and flexible strap 25 is not meant to be limited to the embodiment shown in FIG. 9. That is, the illustration in FIG. 9 is exemplary only. Other methods, configurations, or connection devices may be used.

In accordance with an embodiment, the food receiving receptacle member 12 has a connector on its body and the flexible strap 25 has a corresponding connector that is configured to removably connect with the connector of the food receiving receptacle member. For example, the receptacle member 12 and flexible strap 25 may be configured to snap-in, twist, and/or slide relative to each other in order to connect or disconnect.

For example, in one embodiment, the flexible strap 25 could have a base with a mechanism that a receptacle member 12 removably attaches to, such as via a snap-in or screw-in or other mechanism, that may or may not lock in place. In another embodiment, the flexible strap 25 has mechanism(s) for attachment to a side or surrounding wall of the receptacle member 12.

FIG. 10A is a bottom view of a receptacle member 12 of a food holding device 10C with a connector in accordance with an exemplary embodiment. Receptacle member 12 has an attachment device 54 on the bottom end 18 of its body. In an embodiment, the attachment device 54 may include threads 56 (e.g., male members) and/or be provided in the form of a threaded connector. FIG. 10B is a top view of a strap 25, in accordance with an embodiment, with a corresponding connector configured for use with the receptacle member 12 of FIG. 10A. The flexible strap 25 in FIG. 10B has a base 58 on the strap 25. The base 58 may include threads 60 (e.g., female members) and/or be provided in the form of a threaded connector. The threads 60 of base 58 correspond to the threads 56 of attachment device 54 such that the threads can be used to connect the receptacle member 12 and flexible strap 25. The receptacle member 12 can be aligned with and/or inserted into a threaded receptacle attached to the flexible strap 25 (e.g., by turning or screwing). Alternatively, the connectors can be attached in such a manner such that part of the receptacle member 12 is connected (e.g., screwed) around the base 58. Similar features as previously described are also labeled in FIGS. 10A and 10B and are therefore not repeated here.

In another exemplary embodiment, the attachment device 54 is provided in the bottom side 18 of the receptacle member 12 itself. That is, the bottom side 18 can have a circular indentation therein (e.g., in its center) containing the threads 56. Corresponding threads 60 can be attached directly to the flexible strap 25. The threads 56 on the receptacle member 12 attach to a threaded receptacle on the strap 25 by screwing into place.

In one embodiment, a lock component can be added to ensure that the receptacle member 12 cannot be removed from the flexible strap 25. In an embodiment, a childproof lever-release mechanism could be provided to unlock and release the receptacle member 12 from the base on the flexible strap 25.

The flexible strap 25 and its designs as shown herein are not limited. In accordance with an embodiment, the flexible strap 25 may be designed such that it can be universally used with any number of base or receptacle designs, e.g., interchangeable therewith. In some cases, more than one flexible strap may be provided.

Although the connection devices in FIGS. 10A-10B are shown near or at a central portion of the receptacle member 12 and strap 25, the illustrated embodiments should not be limited to these positions. For example, in accordance with an embodiment, corresponding threads 60 may be provided near one of the opposing ends 32 of the flexible strap 25.

Figure 11A:
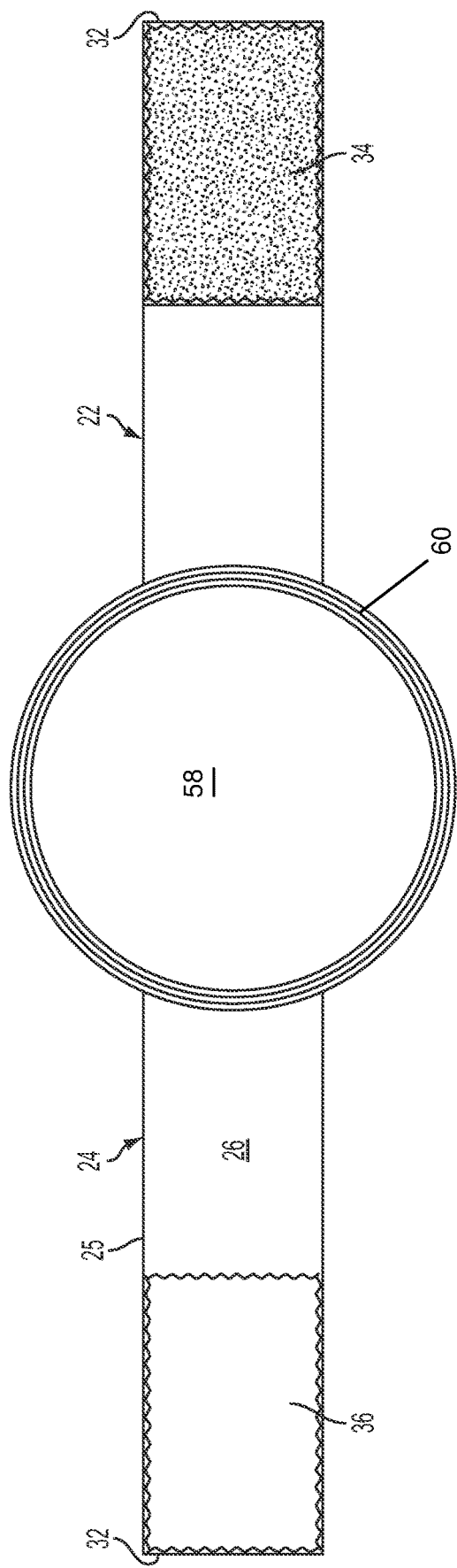
FIG. 11A a top view of a strap in accordance with another exemplary embodiment.
Figure 11C:
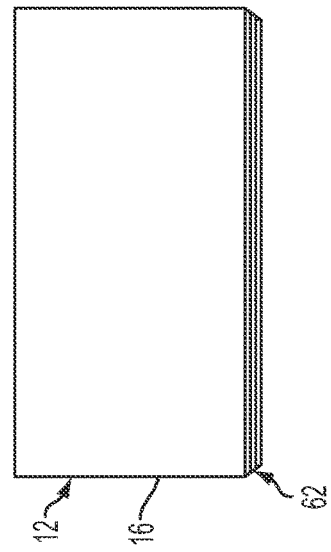
FIG. 11C is a side view of the receptacle member of FIG. 11B.
Figure 11B:
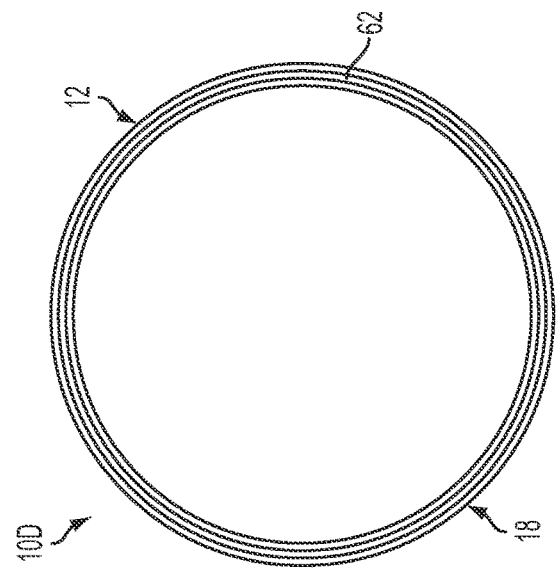
FIG. 11B is a bottom view of a receptacle member in accordance with yet another exemplary embodiment, for use with the strap of FIG. 11A.

An alternate embodiment of threaded connectors used on a flexible strap 25 for a food holding device is shown in FIG. 11A. FIG. 11A is a top view of a strap with a connector for a food holding device, in accordance with another embodiment. The flexible strap 25 in FIG. 11A has a base 58 on the strap 25. The base 58 can have threads 60 (e.g., on an internal edge), for example (e.g., female members), and/or be provided in the form of a threaded connector. As shown in FIGS. 11B and 11C, receptacle member 12 has an attachment device 54 near the bottom end 18 of its body (e.g., near an edge of the surrounding wall 16 and/or corners near the bottom end 18) that corresponds to the base 58 on the flexible strap 25 of FIG. 11A for removably connecting therewith. Specifically, threads 62 (e.g., male members) can be provided on an outside bottom edge at the bottom end 18 of the receptacle member 12, as shown in FIGS. 11B and 11C, for example. The threads 60 of base 58 correspond to the threads 62 of attachment device 54 such that the threads can be used to connect the receptacle member 12 and flexible strap 25. The receptacle member 12 can be aligned with and/or inserted into a threaded receptacle attached to the flexible strap 25 (e.g., by turning or screwing). Alternatively, the connectors can be attached in such a manner such that part of the receptacle member 12 is connected (e.g., screwed) around the base 58. Similar features as previously described are also labeled in FIG. 11A and are therefore not repeated here.

The threaded connectors shown in FIGS. 10A-11C are exemplary only and not meant to be limiting. Also, threaded connectors need not be used with the disclosed devices. As mentioned above, connectors that snap-in, twist, and/or slide relative to each other in order to connect or disconnect the receptacle member 12 and flexible strap 25 can be used.

In addition, in some embodiments, the receptacle member could have a flexible component that allows the angle at which the receptacle member 12 is positioned relative to the strap 25 to be manipulated. In an embodiment, the angle of the receptacle member 12 is adjusted according to the angle at which the object to which it is secured is positioned (e.g., depending on the angle of the thigh of a user in various seating positions, and/or to accommodate different seating inclines). FIG. 12 illustrates an exemplary embodiment of a food holding device 10E with flexible attachment member 64 that connects the bottom end 18 of the receptacle member 12 to the top or exterior side of the flexible strap 25. The flexible attachment member 64 may include flexible crimped sections that can be flexed (e.g., such as indicated by arrow A) in any number of directions and that are configured to hold the receptacle member 12 at an angle relative to at least the flexible strap 25 when moved and flexed. This can assist in providing better access to food inside the receptacle member, such as when the receptacle member 12 is provided higher than a child's or a person's reach. This can also aid in keeping the receptacle member 12 level or balanced relative to the item or limb it is attached to. Similar features as previously described are also labeled in FIG. 12 and are therefore not repeated here.

Figure 21A:
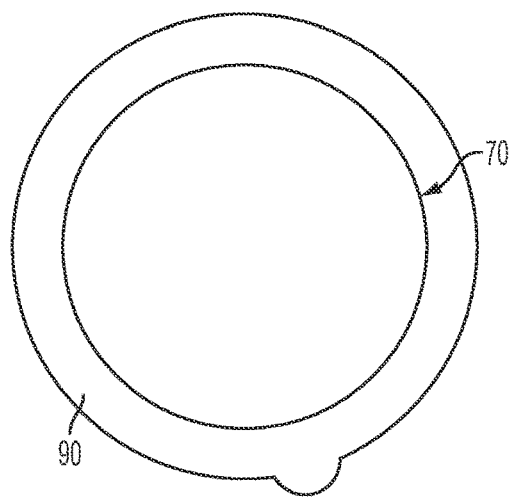
FIGS. 21A and 21B are top and perspective views, respectively, of a lid and an insert in accordance with one exemplary embodiment that can be used with the disclosed exemplary embodiments herein.

The structure of the receptacle member 12 could be comprised of elastic memory material that is configured to form a shell for receipt of a separate container or a removable insert. Such a container or insert can be made of rigid materials (e.g., plastic) that can be secured tightly within the elastic memory shell. The separate container or insert could include, but not be limited to, a device having an attached or detachable lid, such as the example shown in FIG. 21A. The receptacle member 12 may be configured for receipt of a pre-packaged food container.

Figure 13:
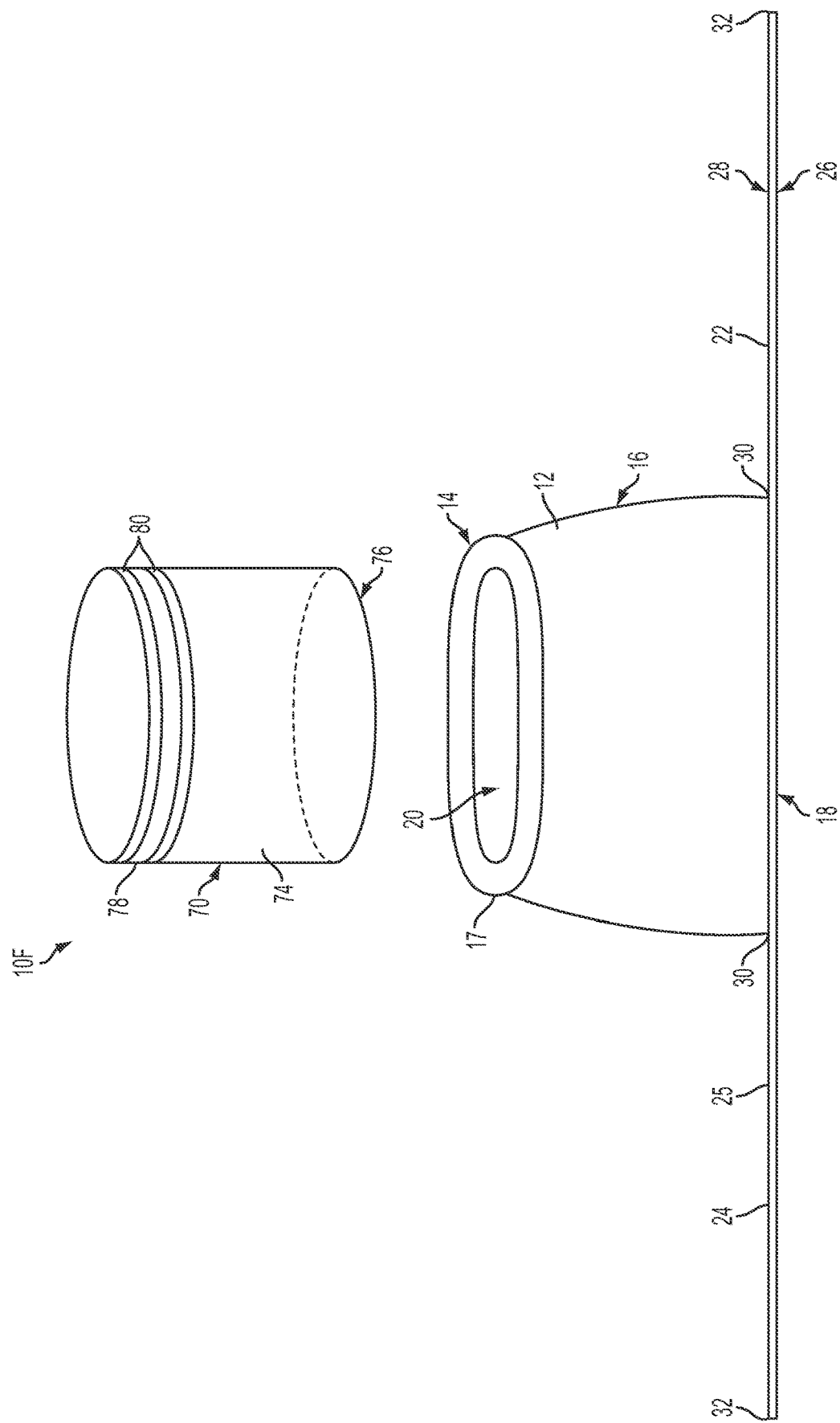
FIG. 13 is a side perspective view of a receptacle member with a shell and a container in accordance with still yet another exemplary embodiment.

FIG. 13 illustrates an example of a food holding device 10F comprising a receptacle member 12 with at least a surrounding wall 16 having a substantially pliable body that has top end 14 with lip 17 and bottom end 18 with base portion 21. In one embodiment, the receptacle member 12 of the food holding device 10F has at least a surrounding wall 16 that is an elastic memory shell. Similar features as previously described are also labeled in FIG. 13 and are therefore not repeated here. A flexible strap 25 is connected to, but may be removably connected to, the receptacle member 12. In an embodiment, the lip 17 may be used for containing a container 70 or a removable insert. For example, the container 70 may include one or more alignment devices 80 configured to align the lip 17 of the receptacle member. In the illustrated exemplary embodiment, two alignment devices 80 are provided in the form of protrusions near a top end of the container 70 with a groove provided between. The lip 17 may include a strong elastic band around the top opening at top end 14 that aligns with and attaches into the groove, between the alignment devices 80, in the container 70.

Figure 14:
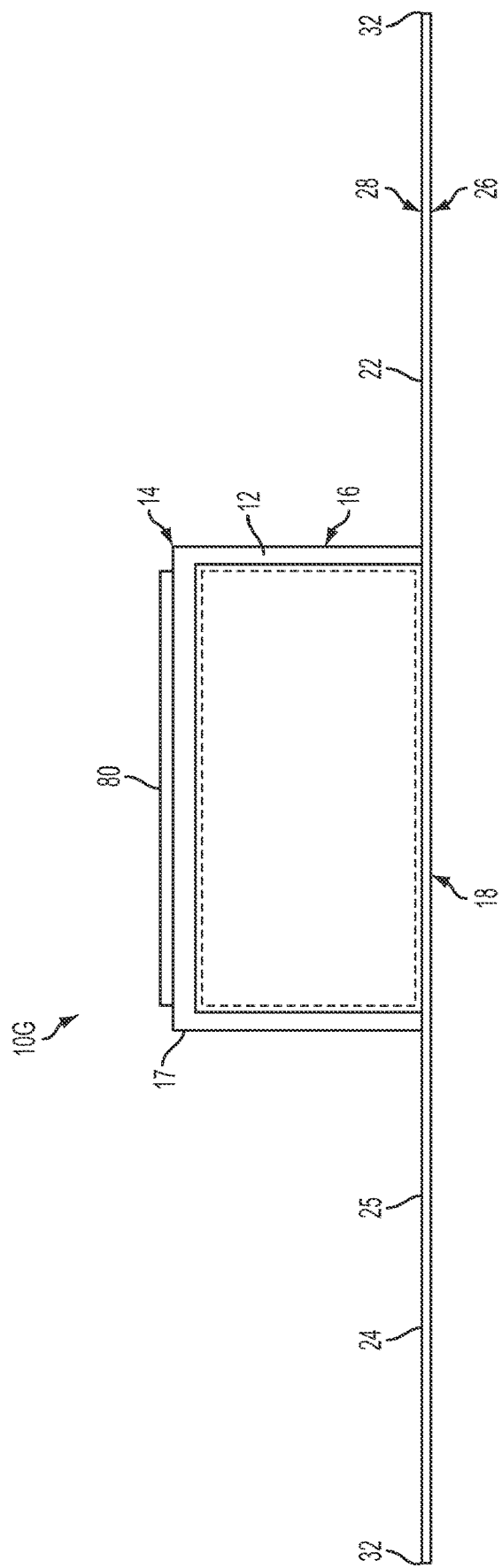
FIG. 14 is a side view of the receptacle member of FIG. 13 with the container inside the shell.

Thus, the container 70 or the removable insert can be inserted through an opening at the top end 14 of the receptacle member 12. A bottom 76 of the container 70 is placed adjacent to the bottom portion 18 of the receptacle member 12. The bottom 76 of the container can include a base portion. FIG. 14 shows the container 70 or insert of FIG. 13 provided within the receptacle member 12 to form an assembled food holding device 10G in accordance with an embodiment. As shown, the surrounding wall 16 in the form of an elastic memory shell conforms to the shape of the container 70 (as shown in FIG. 13). Also, the lip 17 is received within the groove between the two alignment devices 80 (e.g., protrusions). Depending on the placement of the alignment devices 80 and groove, a top end of the container or insert may extend slightly above the top end 14 or lip 17 of the body of the receptacle member 12, but is not necessary.

Figure 15A:
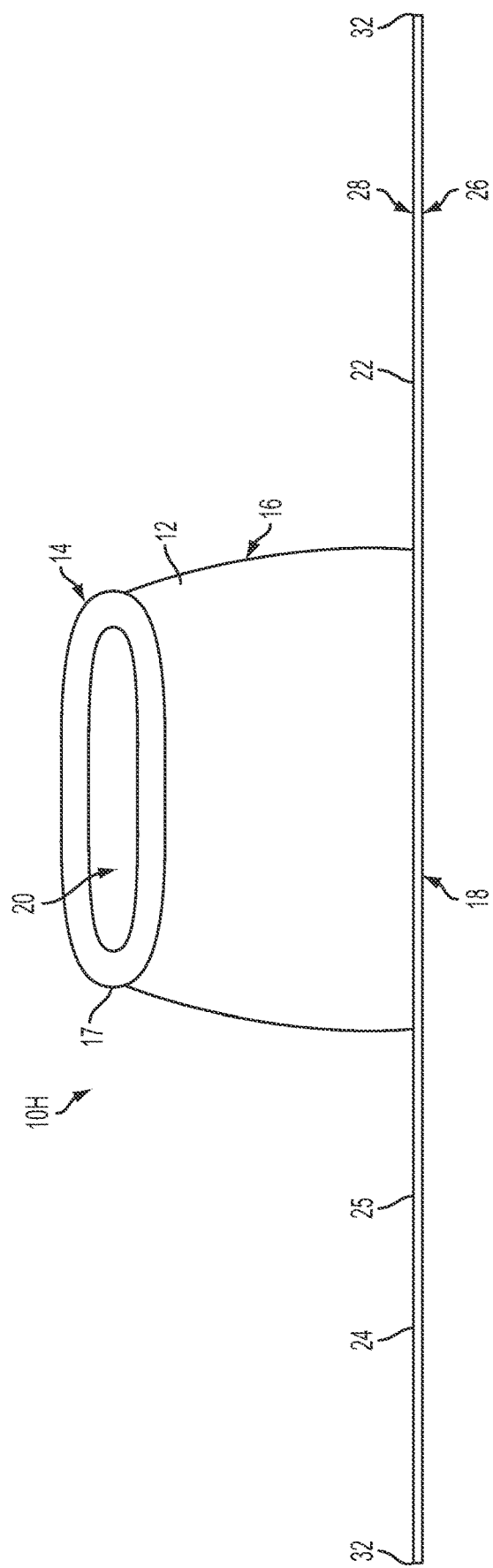
FIG. 15A is a side view of a receptacle member with straps in accordance with yet another exemplary embodiment.
Figure 15C:
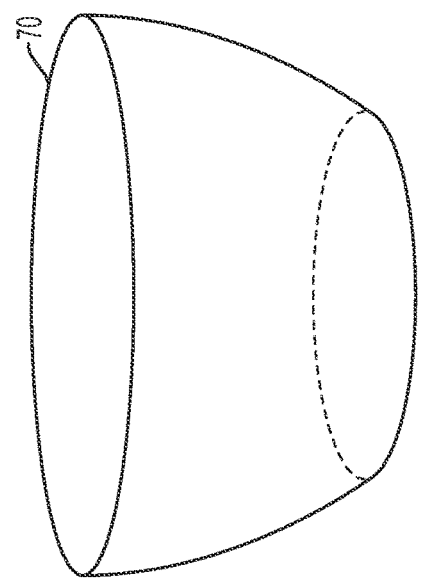
FIGS. 15B and 15C are perspective views of exemplary containers or inserts that can be used with the receptacle member of FIG. 15A.
Figure 15B:
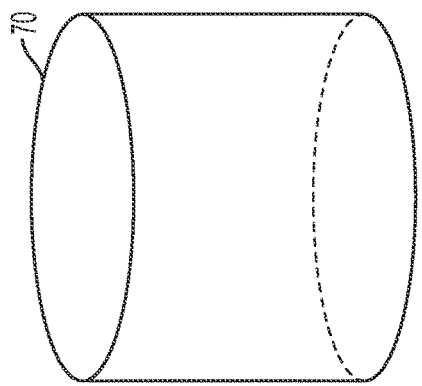

Other exemplary embodiments of a holding device 10 are shown in FIG. 15A. Food holding device 10H includes a food receiving receptacle member 12 with at least a surrounding wall 16 having a substantially pliable body that has top end 14 with lip 17 and bottom end 18 with base portion 21. A flexible strap 25 is connected to, but may be removably connected to, the receptacle member 12. Similar features as previously described are also labeled in FIG. 15A and are therefore not repeated here. FIGS. 15B and 15C show exemplary containers 70 or inserts that should not be limited by their shape or design. Such containers may be inserted into receptacle member 12 of food holding device 10H shown in FIG. 15A, for example.

In one embodiment, the receptacle member 12 of the food holding device 10H as shown in FIG. 15A has at least a surrounding wall 16 that is an elastic memory shell. In an embodiment, the lip 17 may be used for containing a container 70 or a removable insert, such as shown in FIG. 15B or 15C. The lip 17 may include a strong elastic band around the top opening at top end 14 to hold the container 70 therein. Thus, the container 70 or the removable insert can be inserted through an opening at the top end 14 of the receptacle member 12. A bottom of the container 70 can be placed adjacent to the bottom portion 18 of the receptacle member 12. FIG. 16 shows the container 70 of FIG. 15C provided within the receptacle member 12 of FIG. 15A to form an assembled food holding device 10I in accordance with an embodiment. As shown, the surrounding wall 16 in the form of an elastic memory shell conforms to the shape of the container 70 (as shown in FIG. 16). Also, the lip 17 is placed over an edge of the container 70 to hold it therein.

Figure 17A:
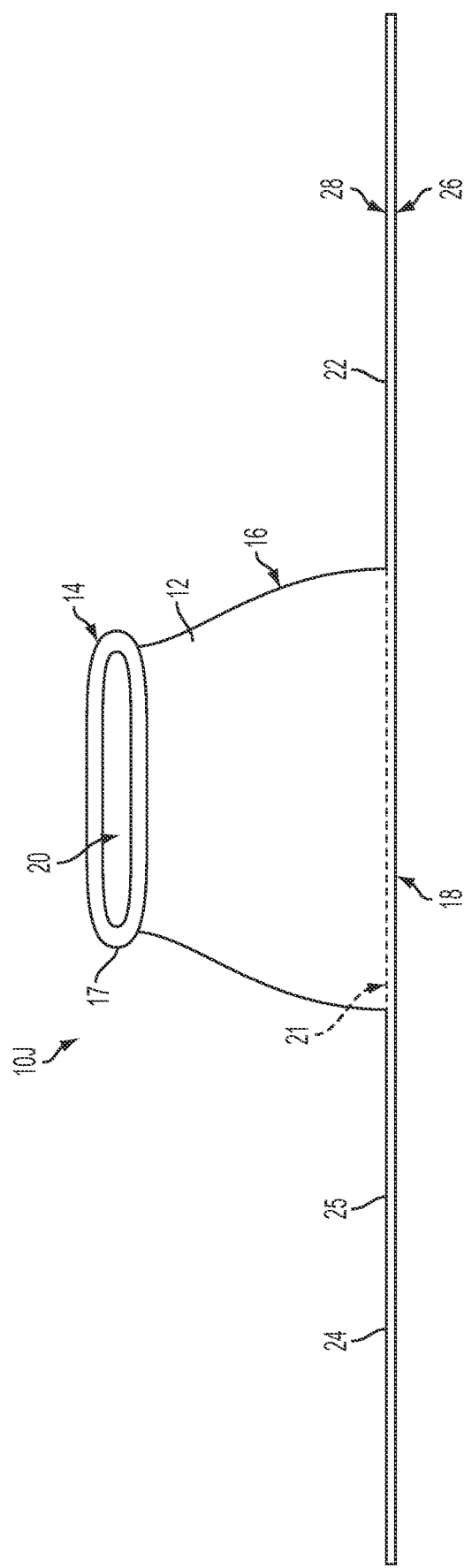
FIG. 17A is side view of a receptacle member in accordance with still yet another exemplary embodiment.
Figure 17B:
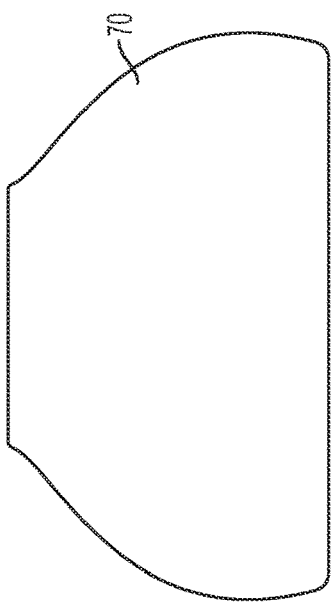
FIG. 17B is a side view of an exemplary container that can be used with the receptacle member of FIG. 17A.

Additionally, in another embodiment, the receptacle member 12 could be in the style of a bottle cooler cover, where the opening at the top end 14 of the receptacle member 12 is smaller than the base portion 21 (e.g., see food holding device 10J of FIG. 17A). The surrounding wall 16 can be made of a substantially pliable material and/or be an elastic memory shell. In an embodiment, a container 70 (or insert), as shown in FIG. 17B, could be inserted through the base portion 21 of the body, i.e., through bottom portion 18. For example, as shown in FIG. 17A, the bottom end 18 of the receptacle member 12 is open, as indicated by the dashed lines. The opening at the top end 14 of the receptacle member 12 can be smaller than the bottom end 18. The surrounding wall 16 conforms to the shape of the container 70 when inserted therein. Also, the lip 17 can be placed over an edge of the container 70 to hold it therein. This method ensures that the separate container (such as shown in FIG. 17B) is contained within the surrounding wall 16 of the receptacle member 12 and cannot be removed from the top of the receptacle member 12. However, it should be understood that the container 70 can also or alternatively be inserted through an opening at the top end 14 of the receptacle member 12, such that a bottom of the container 70 is placed adjacent to the bottom portion 18 of the receptacle member 12. Accordingly, the described open bottom end 18 (indicated by the dashed lines) is not limiting. That is, the bottom end 18 of receptacle member 12 in FIG. 17A can be closed in one embodiment. Similar features as previously described are also labeled in FIG. 17A and are therefore not repeated here.

In one embodiment, the base portion 21 at the bottom end 18 could have slits 84, for example, which are configured for opening and closing. An example of slits 84 are shown in a food holding device 10K of FIG. 18. Accordingly, when the slits 84 are in an open position, a container or insert can enter through the bottom portion 18 of the receptacle member 12. Once the container is in place adjacent to surrounding wall 16, the slits 84 of the base portion 21 are moved to a closed position such that they are flush along the bottom of the container or insert. Similar features as previously described are also labeled in FIG. 18 and are therefore not repeated here.

In another embodiment, the receptacle member 12 is configured to receive a container through an opening at the top end 14 and/or at the bottom end 18. For example, in one embodiment, the receptacle member 12 may be provided as a surrounding wall 16 formed from a band of material with no base portion at bottom end 18 (and a substantially open top end). The surrounding wall can be flexed or stretched around an item. That is, an item (such as a container 70 or an insert or a pre-packaged item) can be surrounded and contained by the band, so that both a top and a bottom of the item held therein are accessible to a user. In accordance with one embodiment, the receptacle member 12 is formed from an elastic ring of material. In such an embodiment, then, the location for attaching or connecting at least one end of the flexible strap 25 to the receptacle member 12 can be altered. For example, the flexible strap 25 can be attached to the receptacle member 12 on its sides or an edge of the surrounding wall 16.

In accordance with yet another embodiment, the flexible strap 25 is a band of material that is attached to receptacle member 12. The flexible strap 25 may be connected to the receptacle member 12 (e.g., sides or surrounding wall 16 or its base 21). The band of material is designed to surround an object (e.g., a limb). For example, the object (e.g., limb) can be inserted through the band of material forming the flexible strap 25. The flexible strap 25 may be formed from a flexible or elastic material(s), for example, and may be stretched for attachment to an object. In accordance with one embodiment, the receptacle member 12 is formed from an elastic ring of material, the location for attaching or connecting at least one end of the flexible strap 25 to the receptacle member 12 can be altered. For example, the flexible strap 25 can be attached to the receptacle member 12 on its sides or an edge of the surrounding wall 16. Depending on its attachment location, the flexible strap 25 in the form of band can allow access to both the top and bottom ends 14 and 18 of the receptacle member.

Figure 21B:
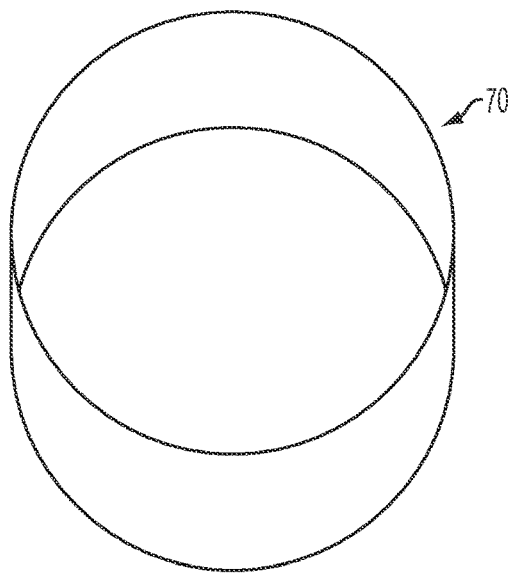
Figure 22:
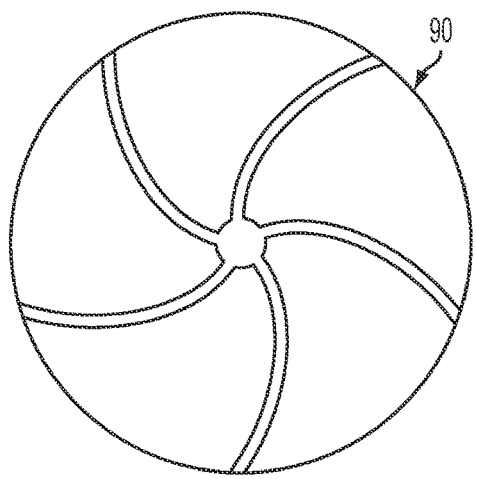
FIG. 22 is a perspective view of a lid in accordance with one exemplary embodiment that can be used with the disclosed exemplary embodiments herein.

Alternatively, in another embodiment, a removable insert for receipt by any of the receptacle members shown in FIGS. 13, 15A, 17A, and/or 18, for example, may be provided in the form of a ring, such as shown in FIG. 21B, with a substantially round wall (and open-ended top and bottom). The surrounding wall 16 can conform to a shape of the wall(s) 74 of the removable insert (e.g., ring), and holds it firmly in place.

In one embodiment, the receptacle member 12 of any of the herein disclosed food holding devices 10 may be formed from disposable and possibly recyclable materials for the purpose of pre-packaged snacks with or without lids. In another embodiment, the entire food holding device 10 itself of any of the herein disclosed embodiments and any of the illustrated embodiments of the Figures (no matter its configuration), is disposable and/or pre-packaged. In still another embodiment, the entire food holding device 10 could be used one time and discarded. In one example, the receptacle member 12 (with its attached strap(s) 25) can be a pre-packaged food item and disposed of after use. The receptacle member 12 can be reusable. In an embodiment, the receptacle member 12 itself can be disposed of and/or reused. In another embodiment, the liner, container, and/or insert used in receptacle member 12 is disposable and/or reused. The flexible strap 25 may be disposable and/or reusable. A reusable strap can be used with different, separate pre-packaged containers—with or without rip top lids—that could attach to the strap 25 (e.g., via screw-in or snap-in mechanisms or slits). In another embodiment, pre-packaged containers can be inserted into cavity 20 of the receptacle member 12.

FIG. 19 shows an example of a rip-top or tear-off lid 90 used with a receptacle member 12 of a food holding device 10L in accordance with an embodiment of this disclosure. The lid 90, as shown in FIG. 19A, can be disposable. Other types of lids, including, but not limited to, disposable lids, re-usable lids, recyclable lids, snap-on lids, screw-on lids, rip-off lids, tear-off lids, and the like may be used with any of the embodiments of the receptacle member 12 disclosed herein, including any of food holding devices 10 illustrated in the Figures. The material(s) used to form a lid 90 (e.g., plastic, paper) are not limited. Similar features as previously described are also labeled in FIG. 19 and are therefore not repeated here.

Figure 20:
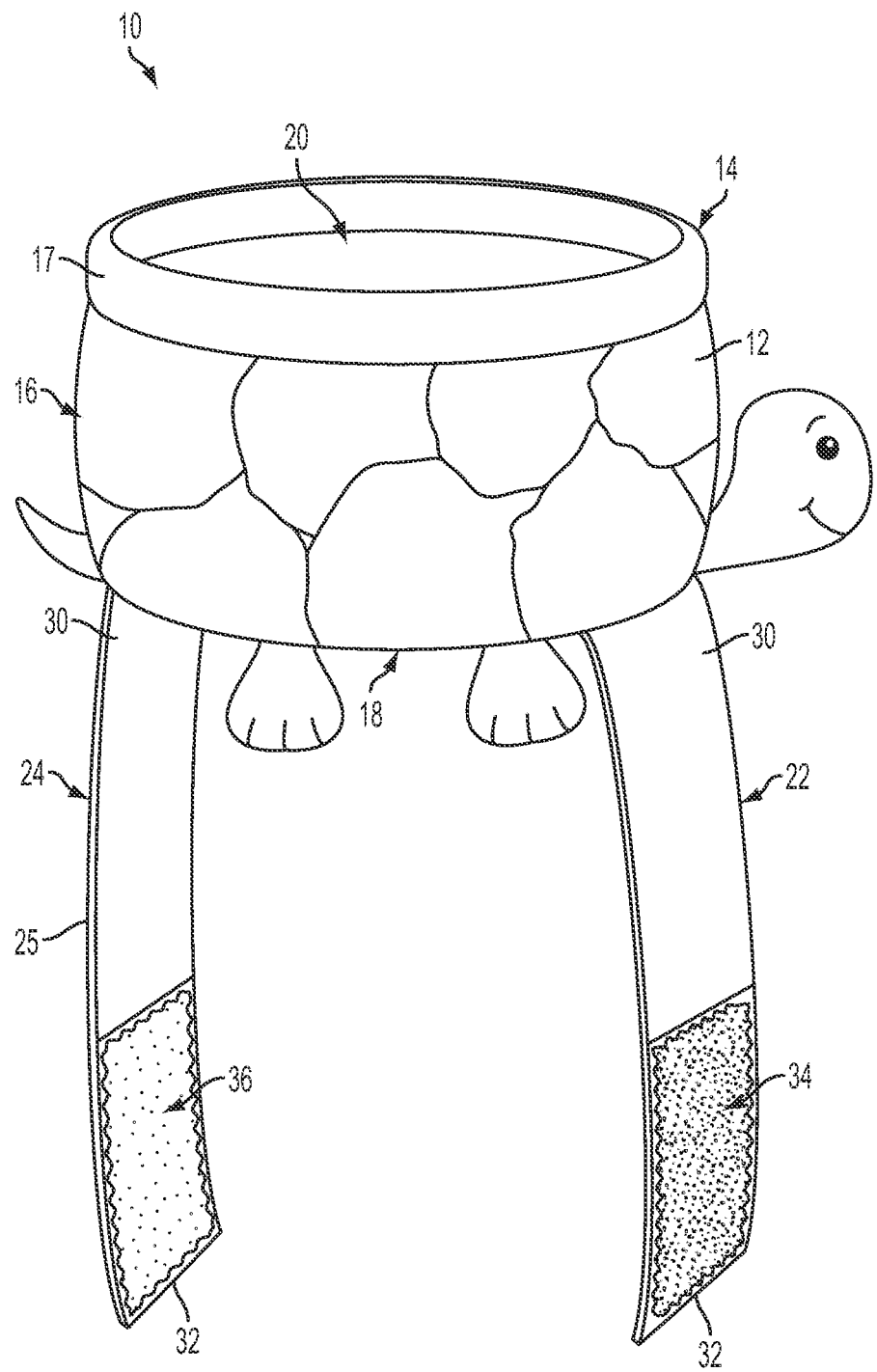
FIG. 20 is a perspective view of a receptacle member in accordance with another embodiment.

The shape, color, size, dimensions, ornamental and decorative features of the receptacle member 12 and the flexible strap 25 of the food holding devices 10 shown in the Figures herein are not meant to be limiting. In accordance with embodiments, for example, the receptacle member 12 can be formed to resemble a variety of shapes, animals, characters, caricatures, themes (e.g., sports products), or inanimate objects while still providing the same functionality described in the exemplary embodiments herein. FIG. 20 illustrates one exemplary embodiment of an ornamental receptacle member in the form of an animal (e.g., turtle). Furthermore, logos may be provided on the food holding device 10. Similar features as previously described are also labeled in FIG. 20 and are therefore not repeated here.

Accordingly, the exemplary embodiments shown herein illustrate examples of food holding devices and features for the device that make access to snacks and food items easier for a child than snack trays. By attaching directly to a body part, for example, a child can eat a snack without the need for a tray or other cumbersome accessories. It reduces and/or substantially eliminates the limited access to receptacle member 12s and devices that are typically placed between or beside the legs of a child, as well as the need to balance a receptacle member 12 on his or her own. It also enables the user to have both hands free.

Further, in accordance with some embodiments, it allows for the device to be secured directly onto the leg or thigh of a child or person when in a seated position. Use of the leg or thigh presents itself as a somewhat flat, substantially even surface which one could easily reach. Also, having the device strapped directly to the leg or thigh helps to alleviate problems of accidentally knocking over the device and spilling the food contents held therein.

It can be used anywhere and anytime a child is in a seated position, for example, and wants to have a snack, or the caregiver wants to keep the child occupied with a snack. However, the device 10 is not limited to use when a child or person is seated, and can be provided to any number of objects for access to items contained therein. Also, it gives children the benefit of eating comfortably while seated without the need to balance the receptacle member 12 on their own, and risk the receptacle member 12 falling down to the ground. Once attached, the receptacle member 12 stays secured in place, e.g., on a limb (e.g., thigh), and will not tip over and cause the contents to spill out. Food remains in a reachable location for the child (e.g., atop the thigh) once the food holding device is attached.

It is a simple, compact, lightweight, substantially pliable, portable, and versatile product that can be tossed or even shoved into a diaper bag, purse, or pocket, and quickly, easily secured onto a child. It can be washable and have insulating properties. This disclosure also describes multiple exemplary features of a snacking accessory that can be used by children. As an accessory, the food holding device may provide a child with a sense of ownership as they would with a blanket or a stuffed toy.

Beyond the benefit and design possibilities described above, using the food holding device may also create a positive experience for a child and caregiver at times, when not having it could result in a negative experience (e.g., frustration by the child when access to food is difficult, and/or frustration by the caregiver when a snack container tips over, spilling its contents because it is not secured in place). In addition, when eating while in a seated position, a natural area to place a food container is on the lap. Therefore, eating from a container that can be secured to a limb such as the thigh is an enhancement to a child's eating experience and a solution to the common problem of an unsecured container falling off the lap resulting in the spillage of its contents. Furthermore, when young children are strapped into their seats, they may have difficulty reaching containers placed anywhere but their lap. The disclosed food holding device alleviates this challenge.

For purposes of clarity and brevity, like elements and components throughout the Figures are labeled with the same designations and numbering as discussed with reference to FIGS. 1-7. Thus, although not discussed entirely in detail herein, one of ordinary skill in the art should understand that various features associated with the food holding device 10 of FIGS. 8-23 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

Also, any reference to securing the device to an object or a child is not meant to be limiting.

Moreover, it should be understood that although reference has been made throughout this disclosure to a food holding device 10, the device 10 may be further and/or alternatively configured to hold other objects, including, but not limited to, beverages or toys or toy parts.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A food holding device configured to be secured to a leg of a seated person to prevent food in the food holding device from spilling and facilitate access to food contained therein, the device comprising:
    a food receiving receptacle member comprising a substantially pliable body having:
        (1) an open top end defining an access opening configured to allow access to the food contained therein by the seated person to whom the food holding device is secured,
        (2) a closed bottom end having a surface that faces away from the access opening, and
        (3) an enclosed, cylindrical surrounding wall formed from an elastic memory material configured to frictionally receive and retain a removable food container inserted through the open top end, wherein the cylindrical surrounding wall includes a peripheral lip that elastically engages at least one alignment device on the removable food container to secure the removable food container in place and facilitate removal and replacement of the removable food container;
    a single flexible strap, comprising a band of material with opposing ends, removably connectable to the food receiving receptacle member and configured to secure the food receiving receptacle member to the leg of the seated person; and
    wherein the food receiving receptacle member comprises at least one opening configured to enable at least one end of the flexible strap to extend therethrough and to secure the food receiving receptacle member to the leg of the seated person, and
    a pivotable attachment component interconnecting the bottom end of the receptacle member and an upper region of the flexible strap, the pivotable attachment component being configured to maintain the receptacle member in an upright orientation relative to the seated person's leg and enabling adjustment of the receptacle member's angle to accommodate varying seating inclines.

2. The device of claim 1, wherein the single flexible strap is configured to wrap around the leg of the seated person to secure the food holding device to a thigh of the seated person such that the surface of the bottom end is positioned on a top surface of the thigh of the seated person.

3. The device of claim 1, wherein the opposing ends of the single flexible strap have cooperating elements thereon that are configured for connection and disconnection around the seated person.

4. The device of claim 3, wherein the cooperating elements are selected from the group consisting of: hook and loop material, snap connectors, buttons, buckles, and clasps.

5. The device of claim 1, wherein the food receiving receptacle member has a threaded connector on the bottom end and wherein the single flexible strap has a corresponding threaded connector that is configured to removably connect with the threaded connector of the food receiving receptacle member.

6. The device of claim 1, wherein the opening comprises an opening at the bottom end of the food receiving receptacle member.

7. The device of claim 1, wherein the opening comprises a pair of slits at the bottom end of the food receiving receptacle member, and wherein the slits are configured to enable at least one end of the flexible strap to extend therethrough and to secure the food receiving receptacle member to the leg of the seated person.

8. The device of claim 1, wherein at least the body of the food holding device is made of silicone.

9. The device of claim 1, wherein the flexible strap is made of an elastic resilient material.

10. The device of claim 1, wherein the top end of the food receiving receptacle member has a lip formed from the same material as food receiving the receptacle member configured to secure the removable container therein.

11. The device of claim 1, wherein the food holding device further comprises a closure configured to restrict access to the top end of the body and to assist in containing food within the food receiving receptacle member.

12. The device of claim 11, wherein the closure comprises a lid removably secured to the top end of the food receiving receptacle member.

13. The device of claim 12, wherein the lid substantially covers the access opening and comprises at least one opening that provides access therethrough to food contained in the food receiving receptacle member while the lid is secured to the food receiving receptacle member and substantially covers the access opening.

14. The device of claim 1 wherein the at least one opening comprises one or more loops attached to the bottom end or cylindrical surrounding wall of the food receiving receptacle member, the one or more loops comprising extra material attached to the food receiving receptacle member or formed in combination with the receptacle member, and the flexible strap is configured to feed through the one or more loops on the food receiving receptacle member.

15. The device of claim 14 wherein the food receiving receptacle member has a connector and the single flexible strap has a corresponding connector that is configured to removably connect with the connector of the food receiving receptacle member.

16. The device of claim 15 wherein the connector is configured such that the food receiving receptacle member is positioned a center of the length of the flexible strap when the strap is connected to the food receiving receptacle member.

17. The device of claim 15 wherein the connector of the food receiving receptacle member and the corresponding connector of the flexible strap are configured to removably connect the food receiving receptacle member and flexible strap via a snap, twist, and/or slide relative to each other in order to connect or disconnect the flexible strap and the food receiving receptacle member.

18. The device of claim 15 wherein the connector of the food receiving receptacle member and/or single flexible strap are configured to removably connect the food receiving receptacle member and flexible strap via insertion through an opening, snaps, buttons, or a hook and loop material.

19. The device of claim 1 wherein the at least one opening comprises at least two loops attached to the bottom end or cylindrical surrounding wall of the food receiving receptacle member, the at least two loops comprising extra material attached to the food receiving receptacle member or formed in combination with the receptacle member, and the flexible strap is configured to feed through the at least two loops on the food receiving receptacle member.

20. The device of claim 19 wherein the food receiving receptacle member has at least one connector and the single flexible strap has a corresponding connector that is configured to removably connect with the connector of the food receiving receptacle member.

21. The device of claim 20 wherein the connector is configured such that the food receiving receptacle member is positioned a center of the length of the flexible strap when the strap is connected to the food receiving receptacle member.

22. The device of claim 20 wherein the connector of the food receiving receptacle member and the corresponding connector of the flexible strap are configured to removably connect the food receiving receptacle member and flexible strap via a snap, twist, and/or slide relative to each other in order to connect or disconnect the flexible strap and the food receiving receptacle member.

23. The device of claim 20 wherein the connector of the food receiving receptacle member and/or single flexible strap are configured to removably connect the food receiving receptacle member and flexible strap via insertion through an opening, snaps, buttons, or a hook and loop material.

24. The device of claim 1 wherein food receiving receptacle member comprises an attachment device located near the bottom end and near the cylindrical surrounding wall configured to receive the flexible strap for removably connecting therewith.

25. The device of claim 1 wherein the flexible strap is formed from a material having elastic and connective properties.

26. The device of claim 1, wherein the removable container with one or more alignment devices configured to align with a lip of the open top end of the food receiving receptacle member when inserted into the enclosed, cylindrical surrounding wall.

\* \* \* \* \*